(12) United States Patent
Craig, III et al.

(10) Patent No.: US 10,837,293 B2
(45) Date of Patent: Nov. 17, 2020

(54) AIRFOIL WITH TUNABLE COOLING CONFIGURATION

(71) Applicant: General Electric Company, Schenectady, NY (US)

(72) Inventors: Charles William Craig, III, West Chester, OH (US); David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 16/039,812

(22) Filed: Jul. 19, 2018

(65) Prior Publication Data

US 2020/0024966 A1    Jan. 23, 2020

(51) Int. Cl.

| *F01D 5/18* | (2006.01) |
| *B22F 5/04* | (2006.01) |
| *B22F 3/105* | (2006.01) |
| *B33Y 80/00* | (2015.01) |
| *B33Y 10/00* | (2015.01) |

(52) U.S. Cl.
CPC ............ *F01D 5/187* (2013.01); *B22F 3/1055* (2013.01); *B22F 5/04* (2013.01); *B33Y 10/00* (2014.12); *B33Y 80/00* (2014.12); *F05D 2230/22* (2013.01); *F05D 2230/237* (2013.01); *F05D 2230/31* (2013.01); *F05D 2260/201* (2013.01);
(Continued)

(58) Field of Classification Search
CPC .......... F01D 5/18; F01D 5/187; B22F 3/1055; B22F 5/04; B33Y 10/00; B33Y 80/00; F05D 2230/22; F05D 2230/237; F05D 2230/31; F05D 2260/201; F05D 2260/202; F05D 2260/22141
See application file for complete search history.

(56) References Cited

U.S. PATENT DOCUMENTS 3,574,481 A * 4/1971 Pyne, Jr. ................. F01D 5/189
                                                        416/90 R
3,930,748 A    1/1976 Redman et al.
(Continued)

FOREIGN PATENT DOCUMENTS

WO    WO-2018022055 A1 *  2/2018  ............. F01D 5/189

OTHER PUBLICATIONS

U.S. Appl. No. 15/877,601, filed Feb. 2, 2018.

*Primary Examiner* — Moshe Wilensky
*Assistant Examiner* — Joshua R Beebe
(74) *Attorney, Agent, or Firm* — Dority & Manning, P.A.

(57) ABSTRACT

Airfoils, additively manufactured airfoils, and methods of manufacturing airfoils are provided. For example, an airfoil comprises opposite pressure and suction sides that extend axially from a leading edge to a trailing edge and radially spaced apart inner and outer ends. The airfoil also comprises an outer wall defining the pressure and suction sides and leading and trailing edges. A rib extends within the airfoil from the pressure side to the suction side of the outer wall and radially from the inner to the outer end. The airfoil further comprises a first pre-impingement chamber surrounded by a first post-impingement chamber and a first dividing wall segment separating the first pre-impingement and first post-impingement chambers and having a plurality of cooling holes defined therein. The outer wall, rib, and first dividing wall segment are integrally formed as a single monolithic component.

20 Claims, 14 Drawing Sheets

(52) U.S. Cl.
CPC ............... *F05D 2260/202* (2013.01); *F05D 2260/22141* (2013.01)

(56) References Cited

U.S. PATENT DOCUMENTS

| | | | |
|---|---|---|---|
| 4,056,332 A | 11/1977 | Meloni | |
| 4,252,501 A | 2/1981 | Peill | |
| 4,297,077 A | 10/1981 | Durgin et al. | |
| 5,246,340 A * | 9/1993 | Winstanley | B23P 15/04 |
| | | | 415/115 |
| 5,464,322 A | 11/1995 | Cunha et al. | |
| 5,626,462 A | 5/1997 | Jackson et al. | |
| 6,065,928 A | 5/2000 | Rieck, Jr. et al. | |
| 6,142,734 A | 11/2000 | Lee | |
| 6,884,036 B2 | 4/2005 | Shi et al. | |
| 6,929,445 B2 | 8/2005 | Zatorski et al. | |
| 6,938,405 B2 | 9/2005 | Carberg et al. | |
| 6,969,233 B2 | 11/2005 | Powis et al. | |
| 7,108,479 B2 | 9/2006 | Beverley et al. | |
| 7,497,655 B1 | 3/2009 | Liang | |
| 7,871,246 B2 * | 1/2011 | Liang | F01D 5/187 |
| | | | 416/97 R |
| 9,726,024 B2 | 8/2017 | Buhler et al. | |
| 9,777,581 B2 * | 10/2017 | Nilsson | F01D 5/189 |
| 2005/0281663 A1 | 12/2005 | Trindade et al. | |
| 2009/0324385 A1 * | 12/2009 | Liang | F01D 5/187 |
| | | | 415/115 |
| 2013/0280091 A1 * | 10/2013 | Propheter-Hinckley | B22F 3/1055 |
| | | | 416/97 A |
| 2014/0219788 A1 * | 8/2014 | Nilsson | F01D 5/189 |
| | | | 415/175 |
| 2015/0298212 A1 * | 10/2015 | Hann | B22F 5/009 |
| | | | 419/12 |
| 2016/0290157 A1 | 10/2016 | Ning et al. | |
| 2017/0145833 A1 * | 5/2017 | Thornton | F01D 5/187 |
| 2017/0167269 A1 * | 6/2017 | Itzel | F01D 5/187 |
| 2017/0335716 A1 | 11/2017 | Bergholz et al. | |
| 2018/0230836 A1 * | 8/2018 | Tibbott | F01D 9/065 |
| 2018/0371920 A1 * | 12/2018 | Packer | F01D 5/147 |

* cited by examiner

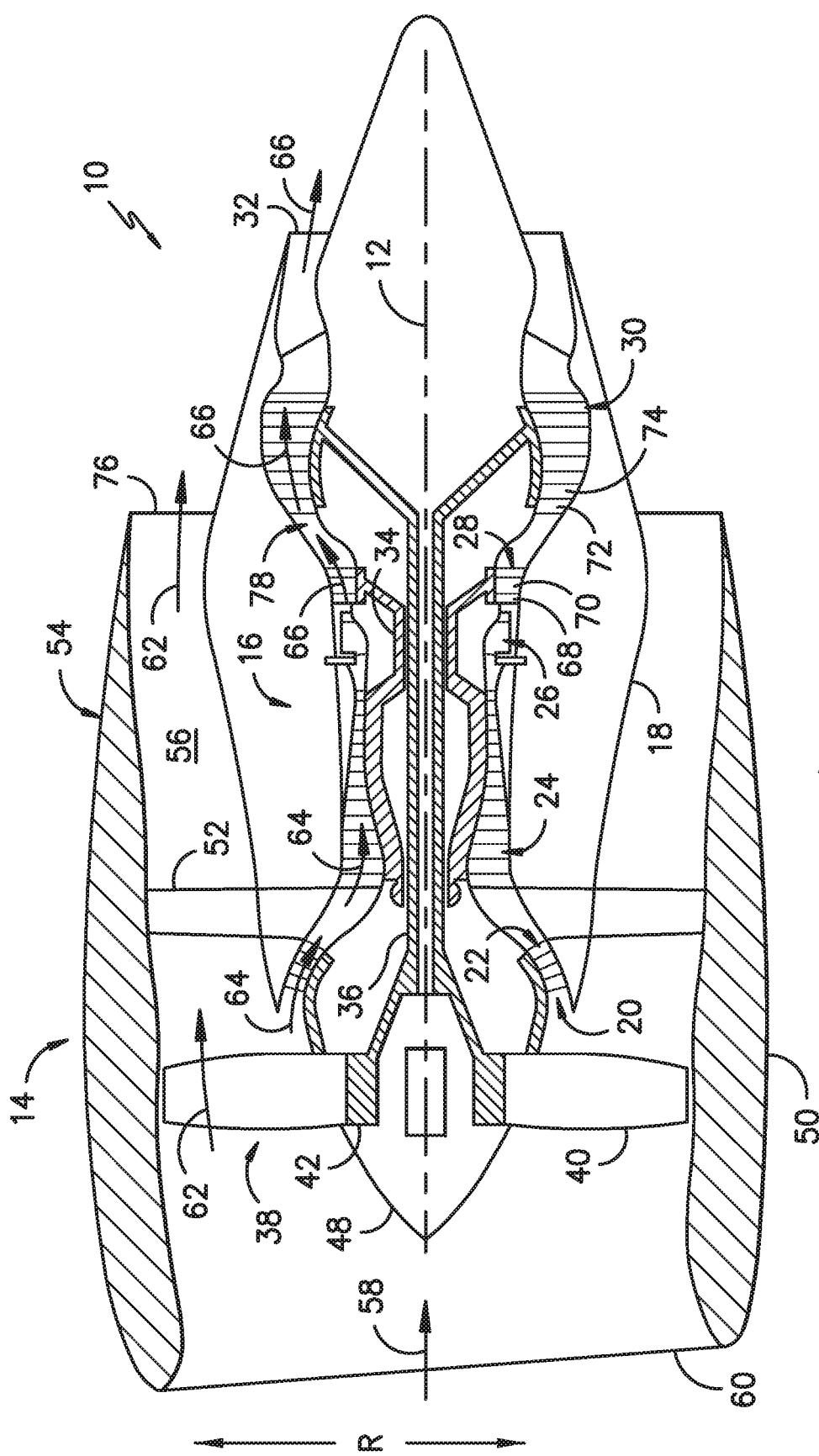
FIG. -1-

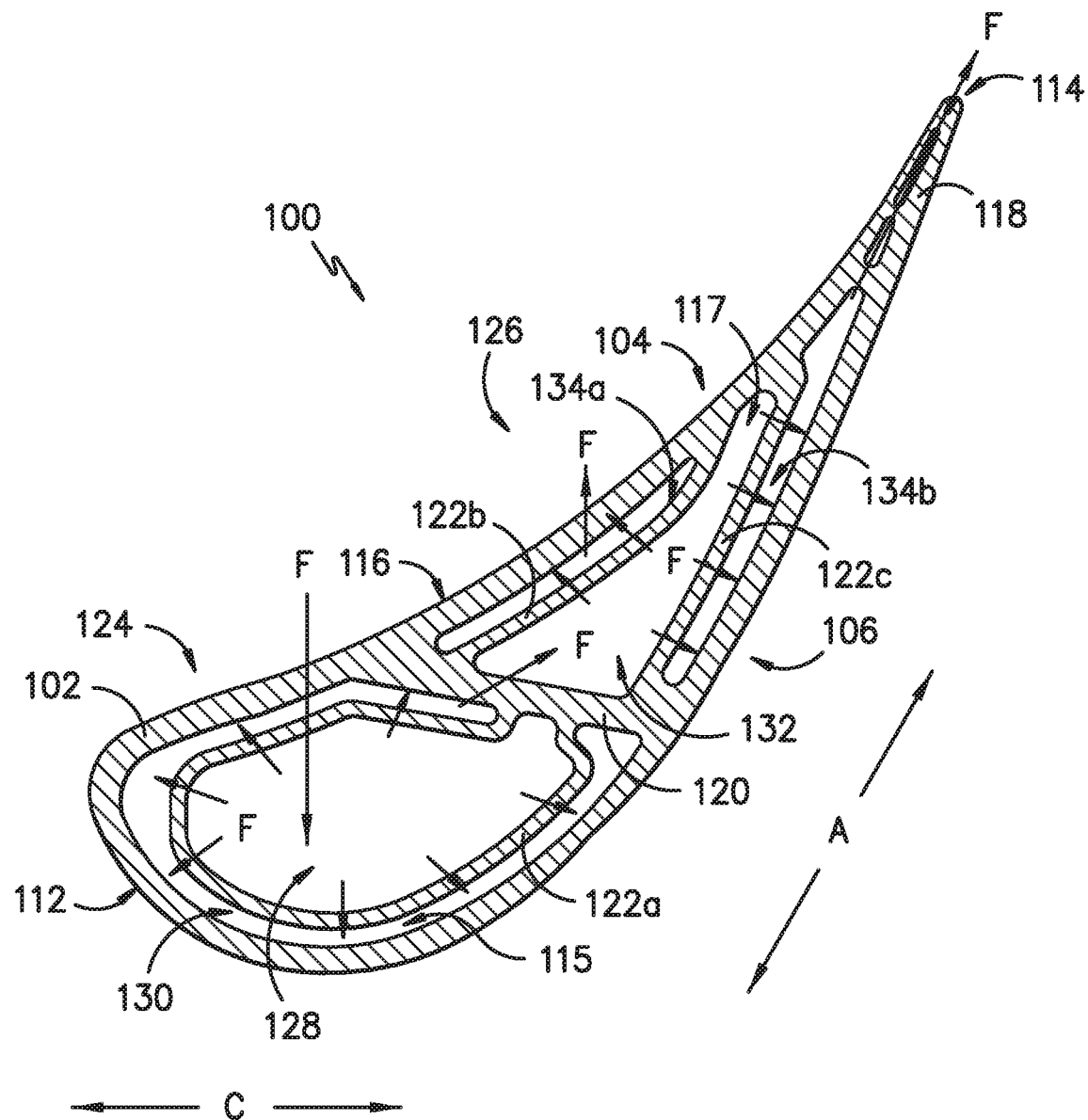
FIG. -2A-

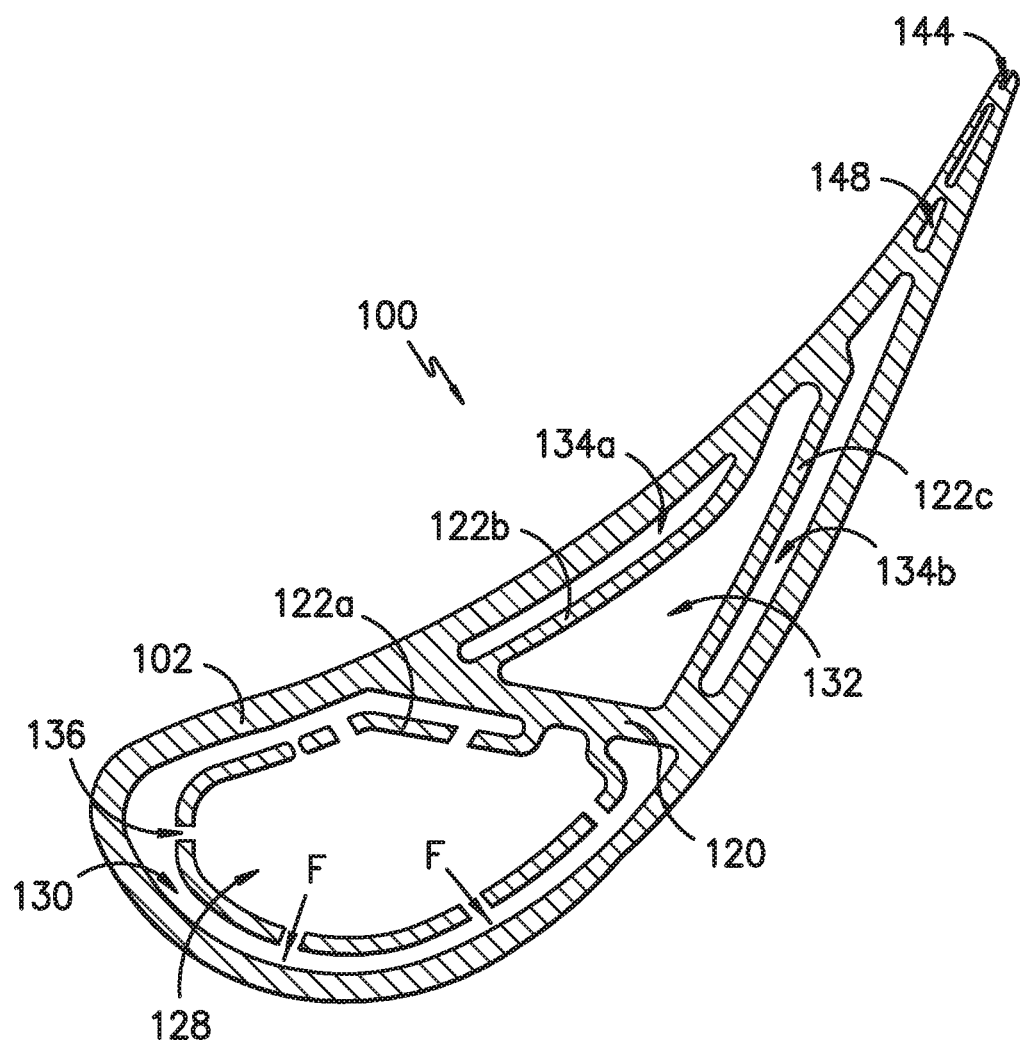
FIG. -2B-

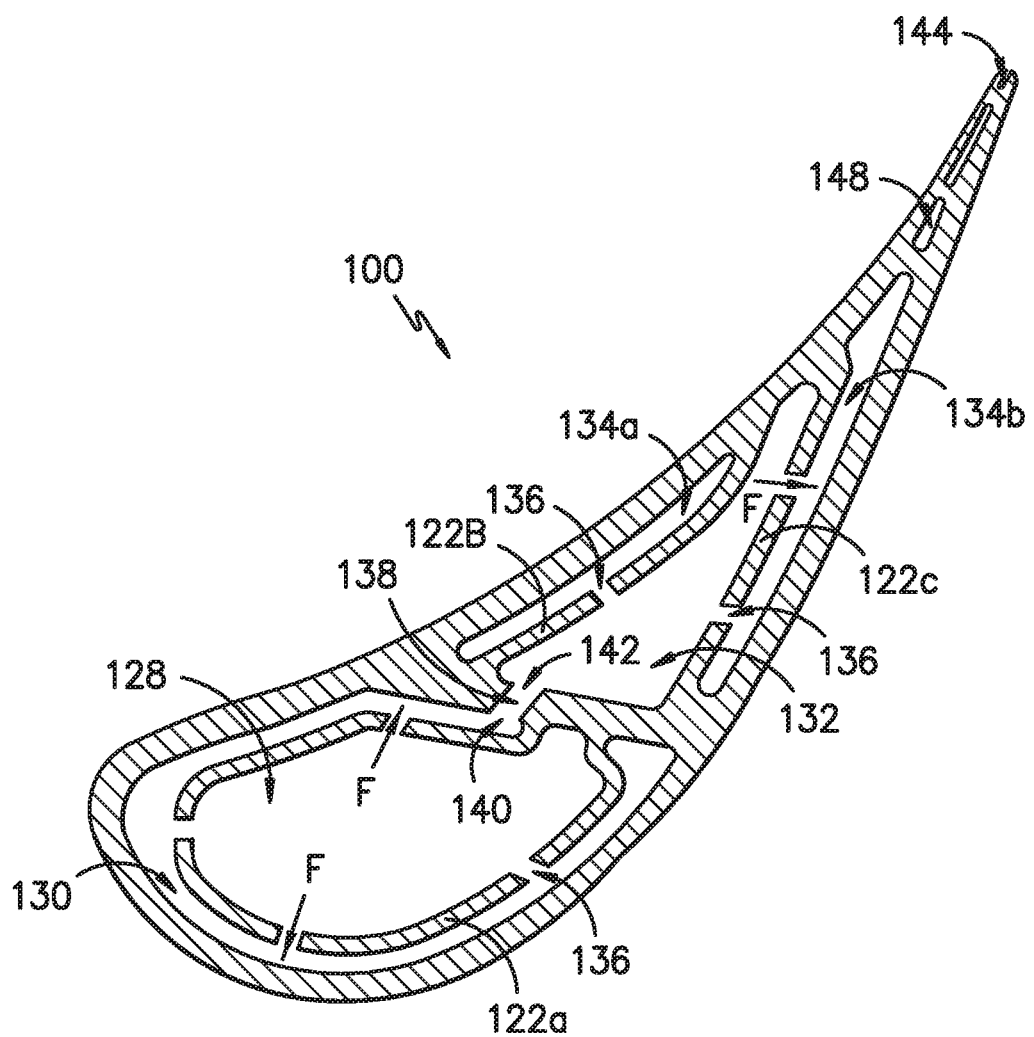
FIG. -2C-

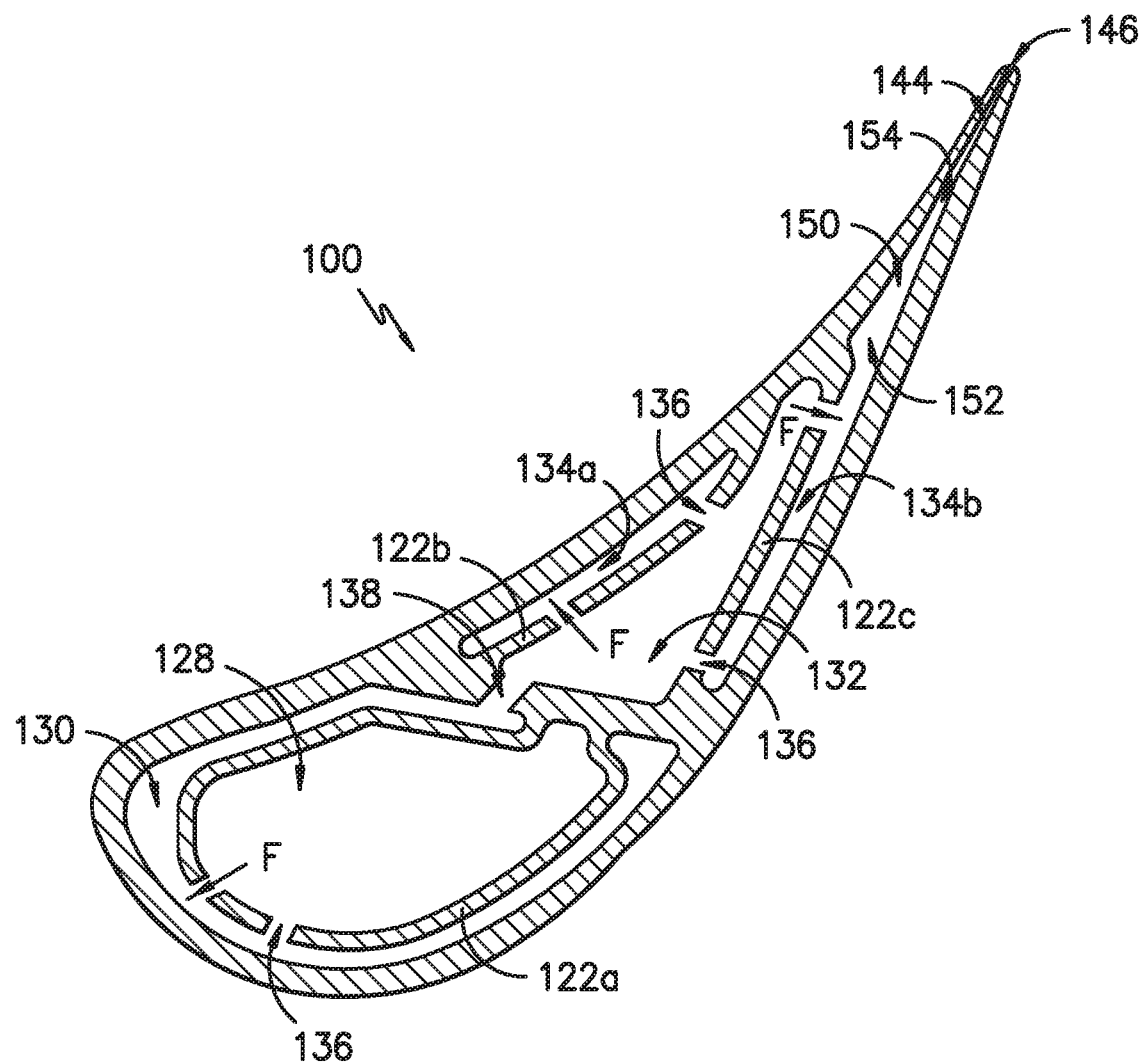
FIG. -2D-

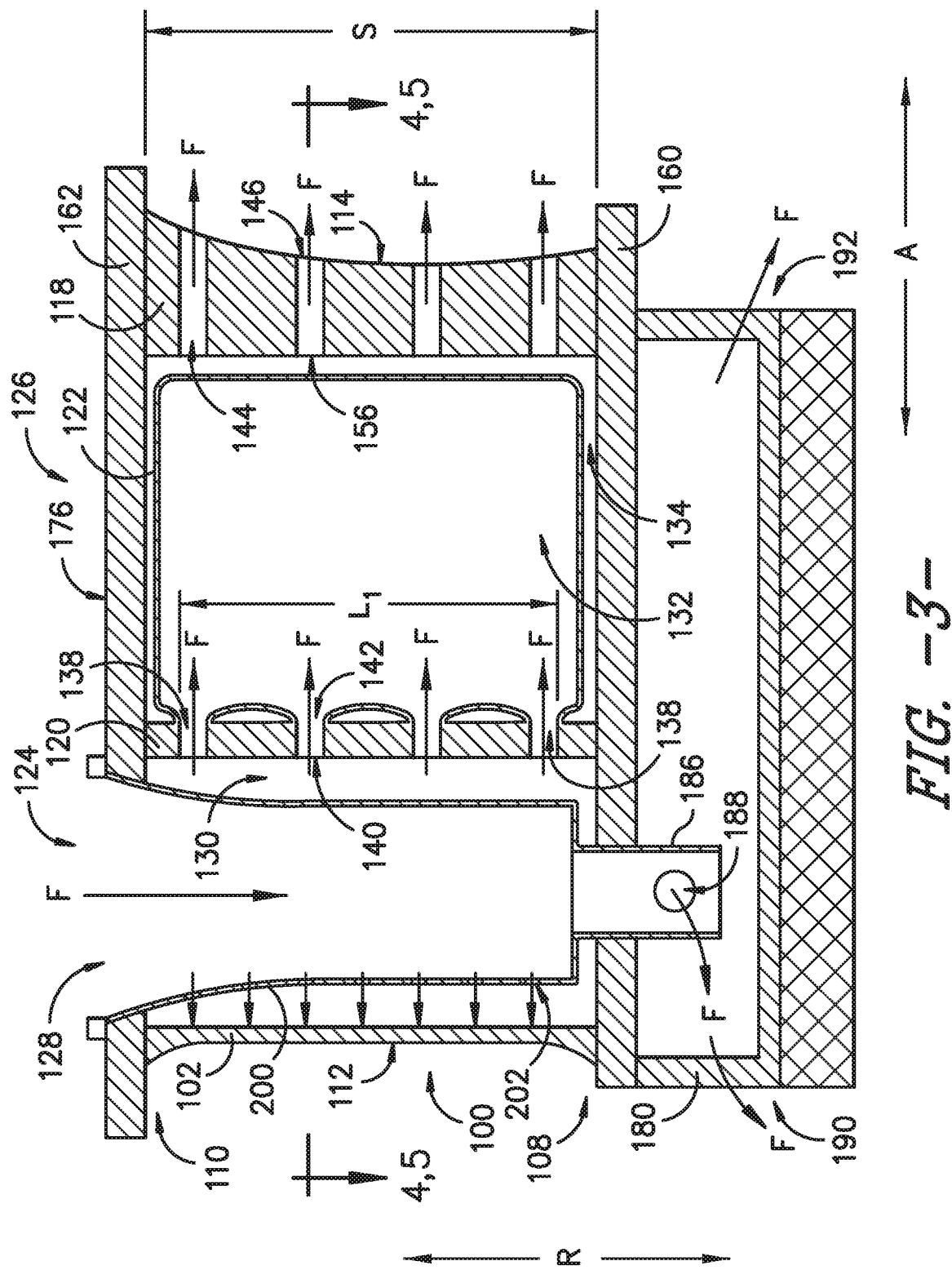
FIG. -3-

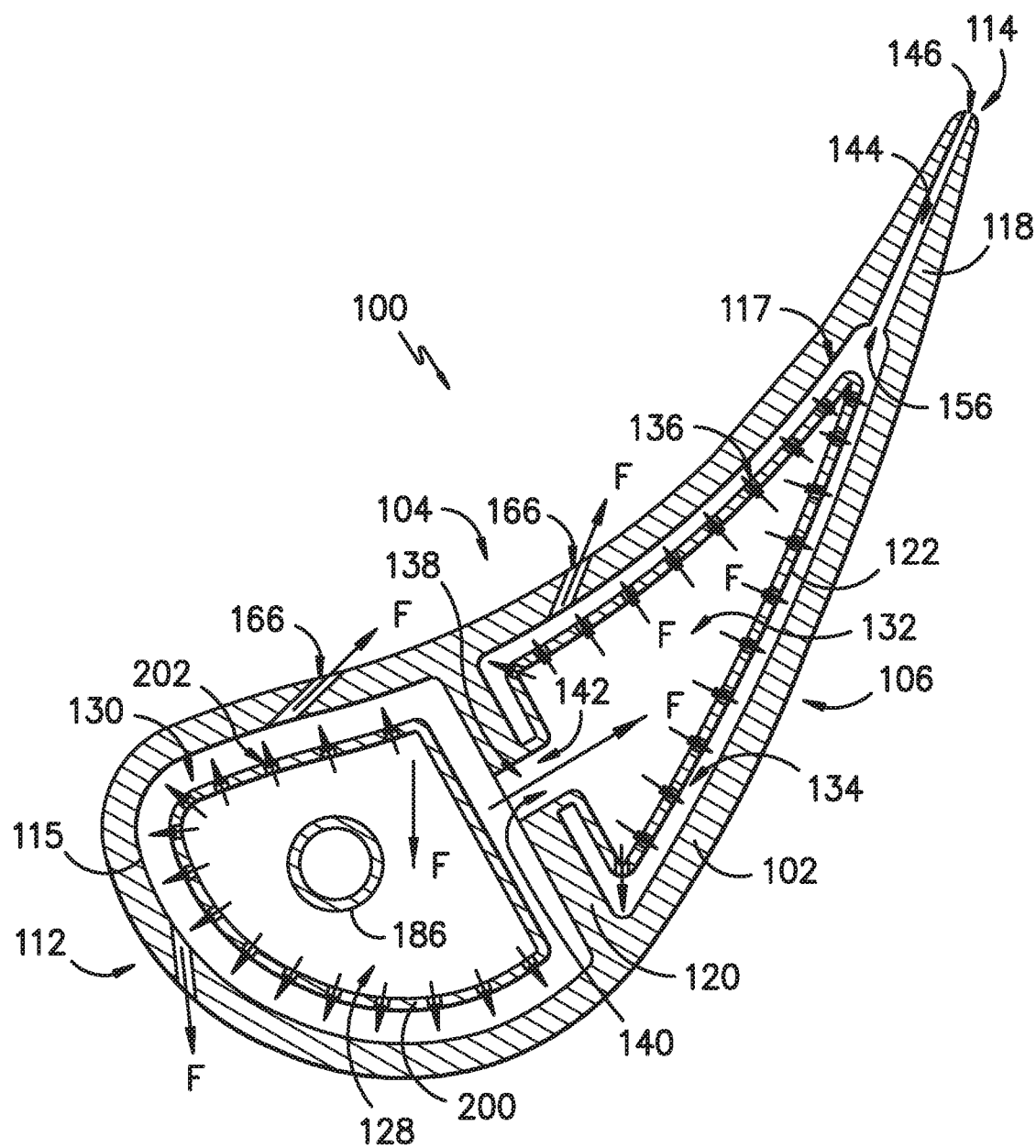
FIG. -4-

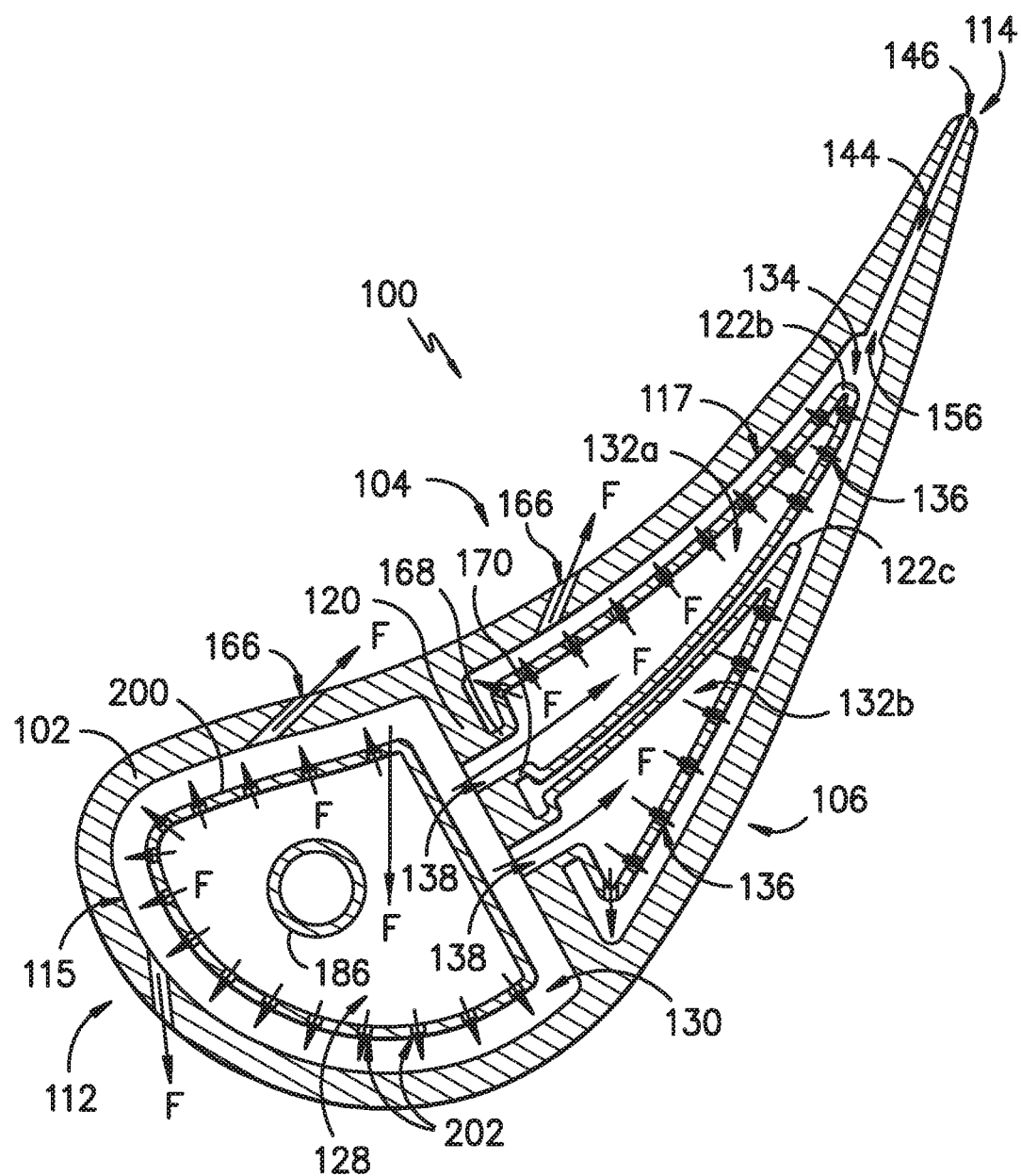
FIG. -5-

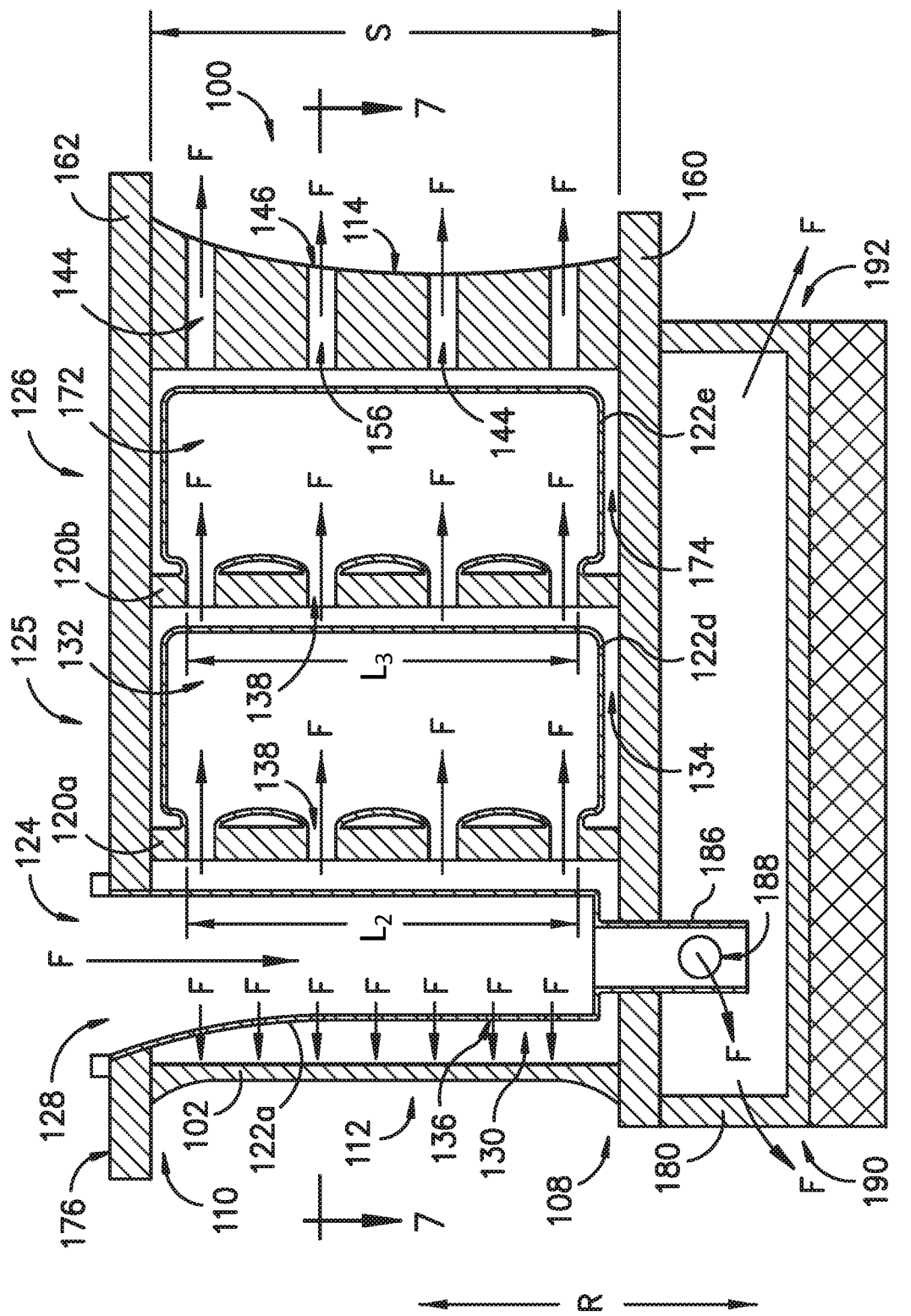
FIG. -6-

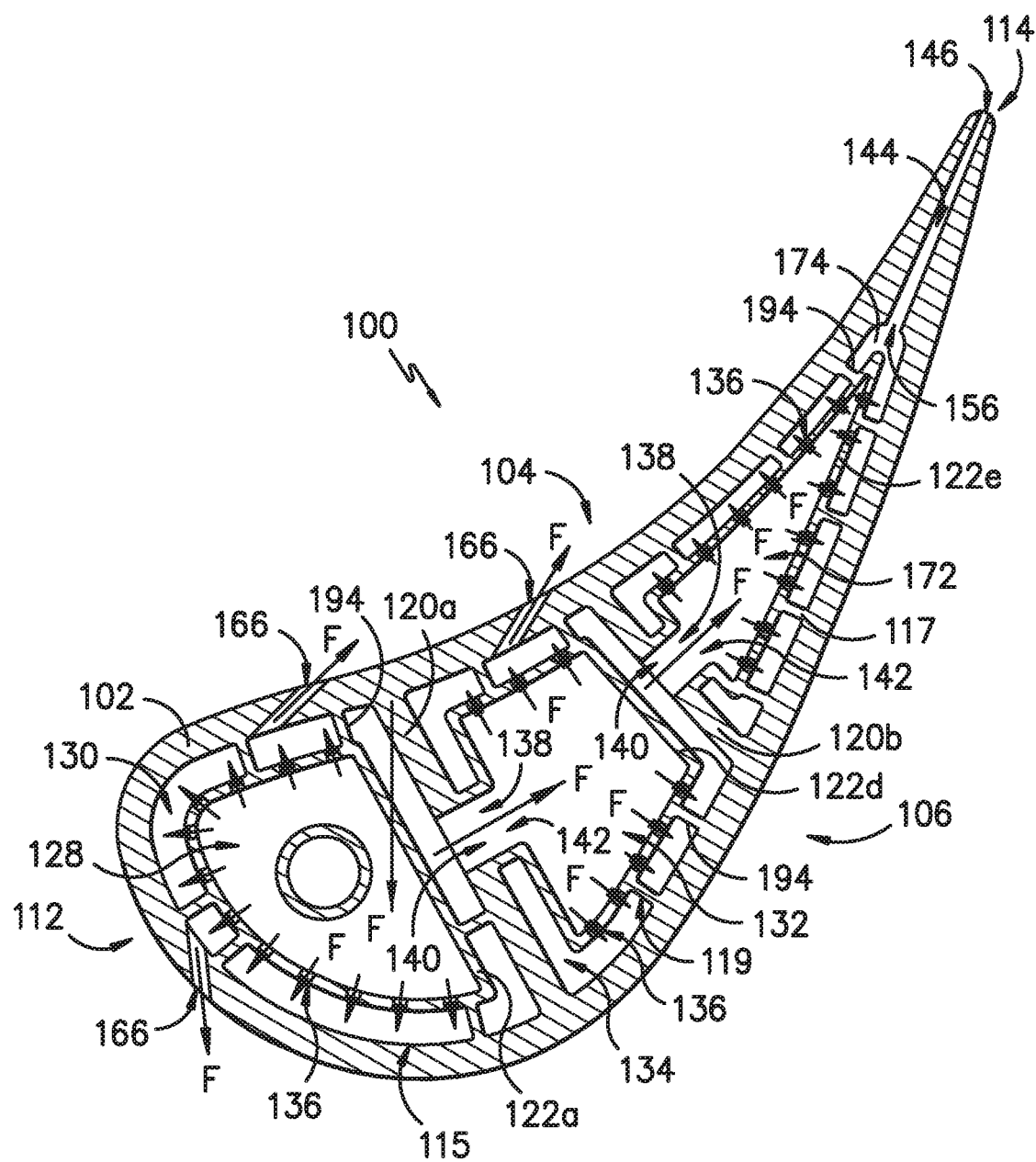
FIG. -7-

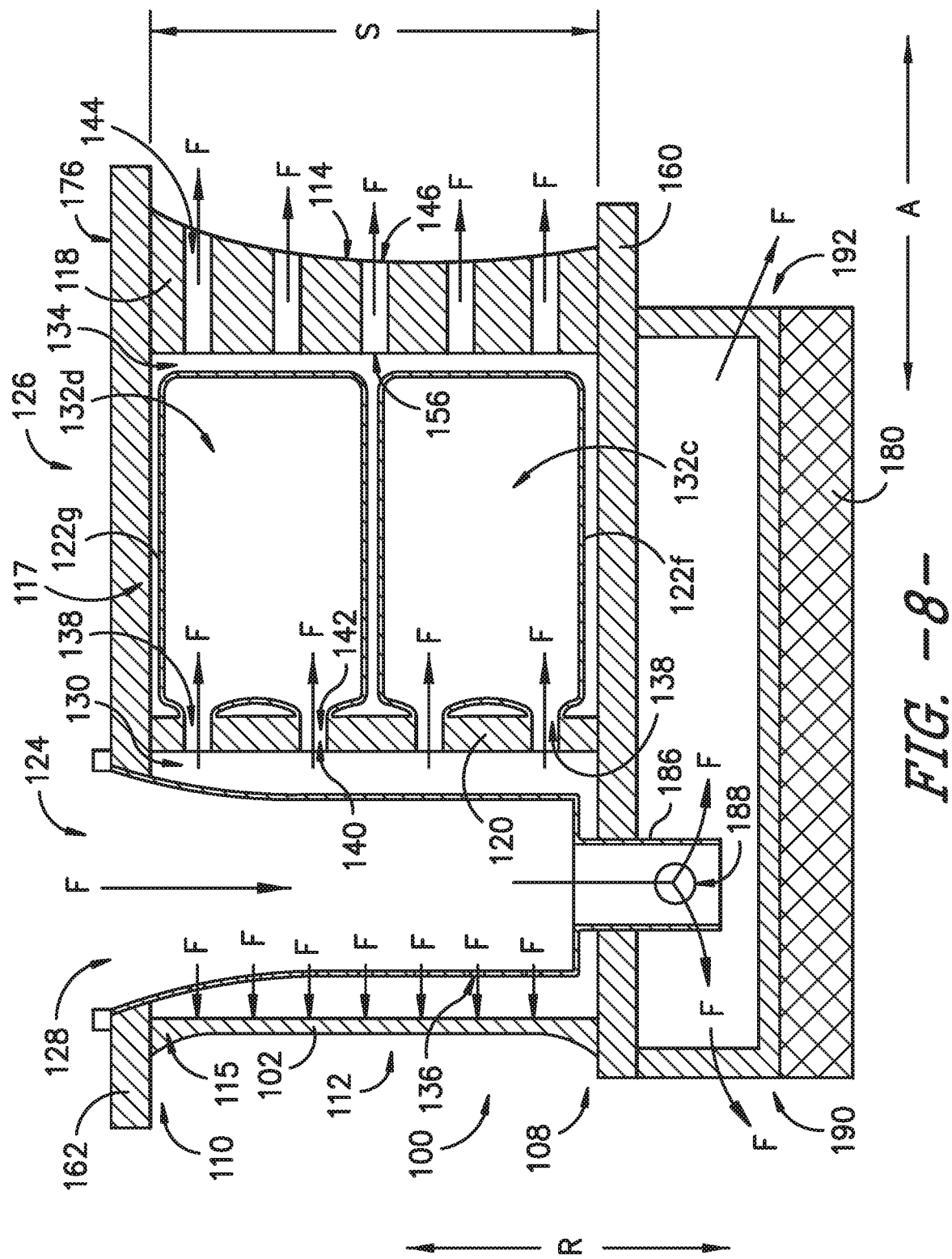
FIG. -8-

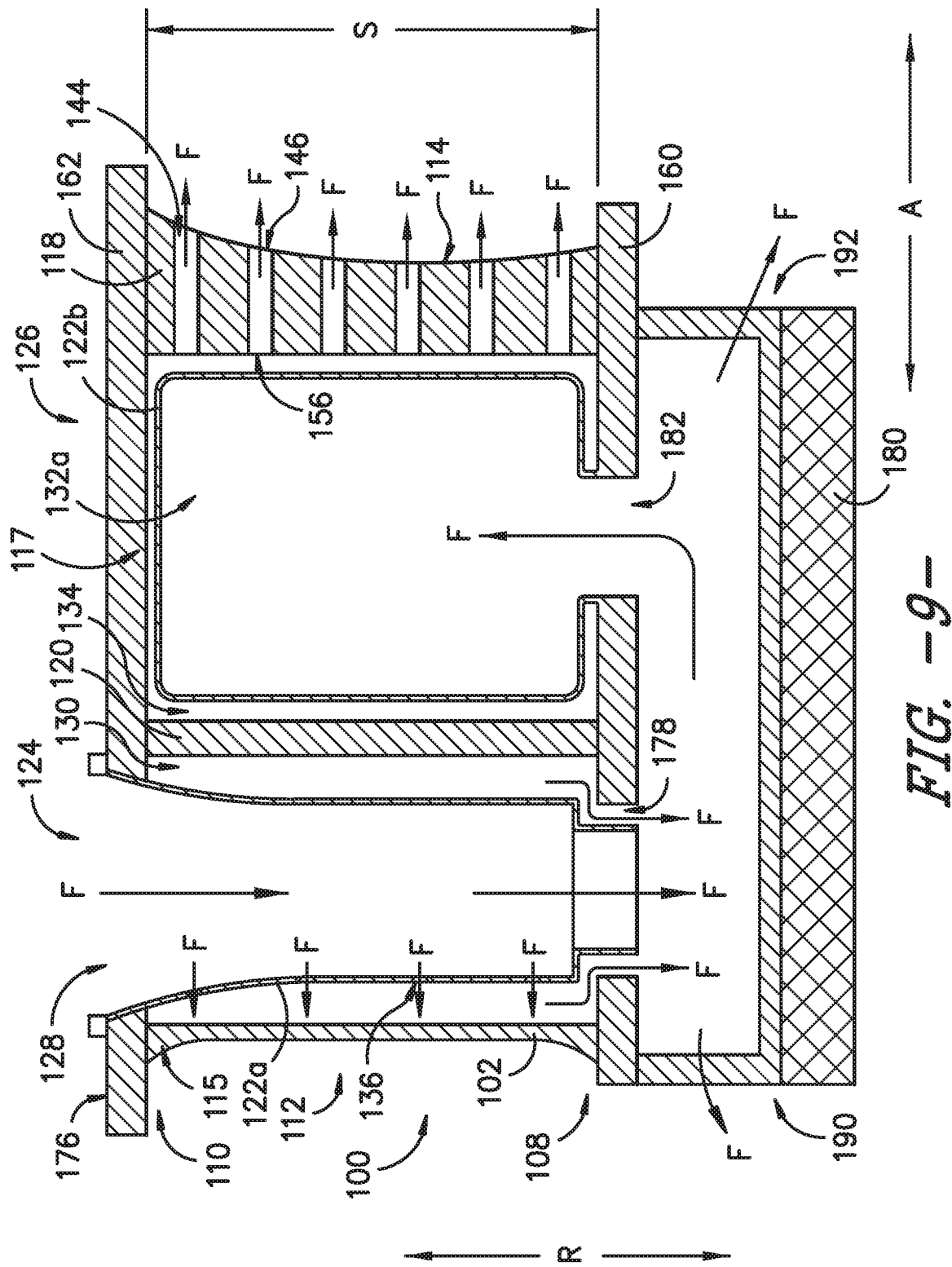

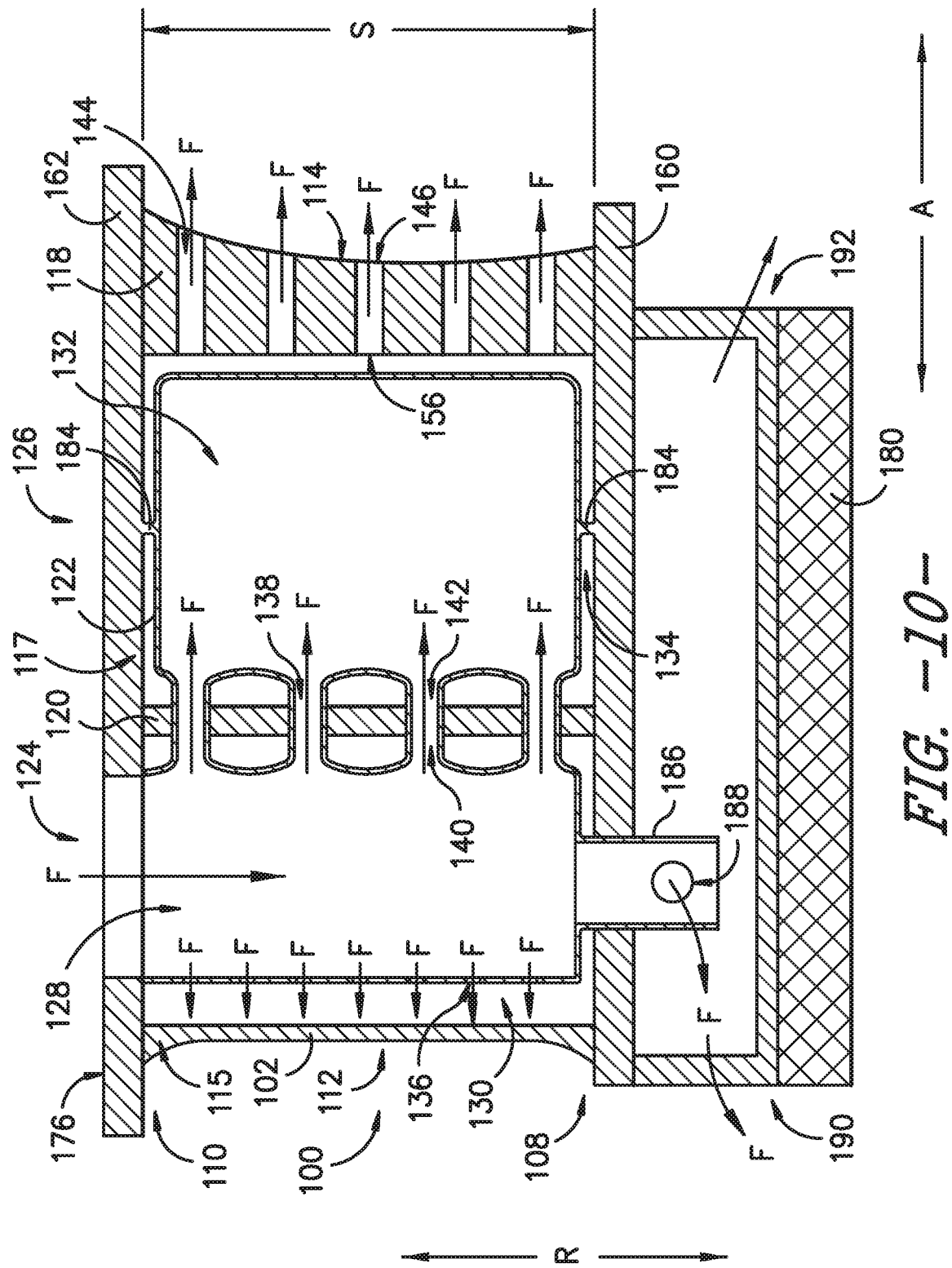
FIG. -10-

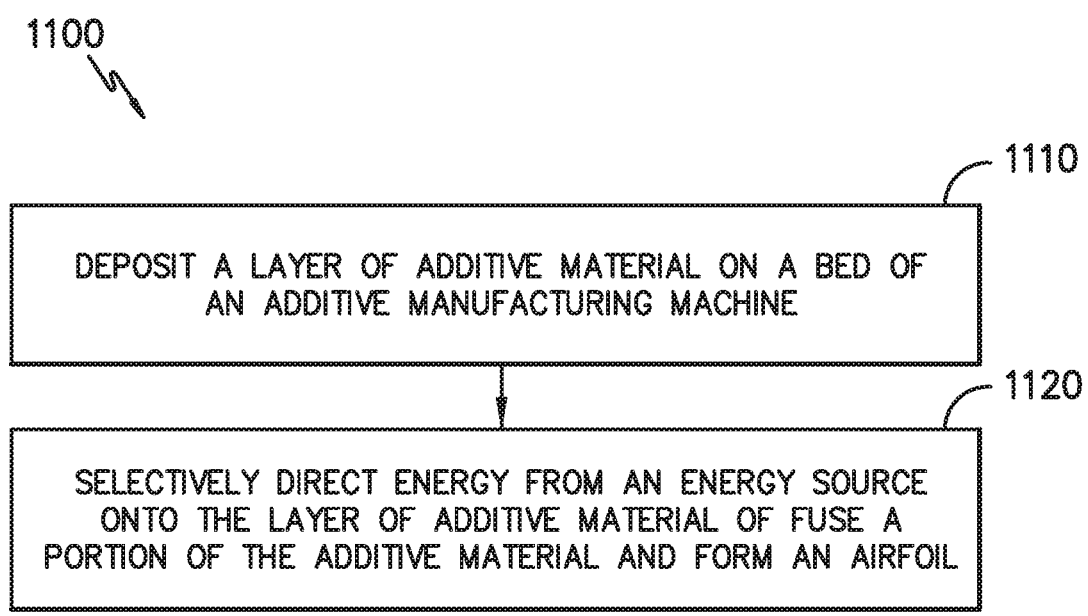
FIG. -11-

AIRFOIL WITH TUNABLE COOLING CONFIGURATION

FIELD

The present subject matter relates generally to gas turbine engines. More particularly, the present subject matter relates to airfoils for gas turbine engines having cooling holes defined therein, and most particularly, a configuration of the cooling holes may be tuned according to, e.g., airfoil cooling needs.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, a gas turbine engine includes a plurality of airfoils within, for example, the compressor section and the turbine section. The airfoils may define one or more internal cavities for receipt of a fluid that is used to cool the airfoil. For instance, an impingement baffle insert may be received within the airfoil cavity such that the cooling fluid may pass through the baffle and impinge on inner surfaces of the airfoil to cool the airfoil. The cooling fluid may then be expelled from the airfoil interior, e.g., as a film of cooling fluid to cool the airfoil exterior.

However, a typical airfoil assembly comprising the airfoil and the impingement baffle insert is not easily adaptable to the myriad of cooling configurations that could be used to improve engine performance. More particularly, providing cooling at specific airfoil locations could improve engine performance, but it is difficult to manufacture an impingement baffle insert and install or assemble the insert within the airfoil such that the cooling fluid is supplied at the specific locations. Nonetheless, the impingement baffle can be integrated into the airfoil, e.g., through an additive manufacturing process, which would allow for a more tunable airfoil cooling scheme. Further, an integral impingement baffle could reduce the overall dedicated cooling for airfoils such as turbine nozzles, e.g., because the cooling fluid could be directed to the specific needed locations. Moreover, an integral impingement baffle could reduce specific fuel consumption (SFC), and reduce part count and assembly complexity by eliminating the need for an impingement baffle insert. Further, by additively manufacturing the airfoil with an integral impingement baffle, the airfoil cooling scheme could be tailored for an endless number of configuration variations without negatively impacting the manufacturing time and cost and/or the assembly complexity of the engine.

Accordingly, improved airfoils, such as those having an integral impingement baffle, would be desirable. For example, an airfoil having an integral impingement baffle that divides an airfoil cavity into at least two chambers such that a cooling fluid moves through the chambers in series would be beneficial. Further, an airfoil formed by additive manufacturing and having an integral impingement baffle would be useful.

BRIEF DESCRIPTION

Aspects and advantages of the invention will be set forth in part in the following description, or may be obvious from the description, or may be learned through practice of the invention.

In one exemplary embodiment of the present subject matter, an airfoil is provided. The airfoil comprises a concave pressure side opposite a convex suction side and an inner end radially spaced apart from an outer end. The pressure side and the suction side extend axially from a leading edge to a trailing edge. The airfoil also comprises an outer wall defining the pressure side, suction side, leading edge, and trailing edge; and a rib extending within the airfoil from the pressure side of the outer wall to the suction side of the outer wall. The rib also extends radially from the inner end to the outer end. The airfoil further comprises a first pre-impingement chamber, a first post-impingement chamber surrounding the first pre-impingement chamber, a first dividing wall segment separating the first pre-impingement chamber from the first post-impingement chamber, and a plurality of cooling holes defined in the first dividing wall segment. The outer wall, rib, and first dividing wall segment are integrally formed as a single monolithic component.

In another exemplary embodiment of the present subject matter, an additively manufactured airfoil is provided. The additively manufactured airfoil comprises a concave pressure side opposite a convex suction side and an inner end radially spaced apart from an outer end. The pressure side and the suction side extend axially from a leading edge to a trailing edge. The additively manufactured airfoil further comprises an outer wall defining the pressure side, suction side, leading edge, and trailing edge; and a rib extending within the airfoil from the pressure side of the outer wall to the suction side of the outer wall. The rib also extends radially from the inner end to the outer end. The additively manufactured airfoil also comprises at least two impingement chambers arranged in series, a dividing wall separating the at least two impingement chambers, and at least one cooling hole defined in the dividing wall such that a cooling fluid can pass from one impingement chamber to another through the at least one cooling hole.

In a further exemplary embodiment of the present subject matter, a method of manufacturing an airfoil is provided. The method comprises depositing a layer of additive material on a bed of an additive manufacturing machine, and selectively directing energy from an energy source onto the layer of additive material to fuse a portion of the additive material and form the airfoil. The airfoil comprises a concave pressure side opposite a convex suction side and an inner end radially spaced apart from an outer end. The pressure side and the suction side extending axially from a leading edge to a trailing edge. The airfoil also comprises an outer wall defining the pressure side, suction side, leading edge, and trailing edge; and a rib extending within the airfoil from the pressure side of the outer wall to the suction side of the outer wall. The rib also extends radially from the inner end to the outer end. The airfoil further comprises a pre-impingement chamber, a post-impingement chamber surrounding the pre-impingement chamber, a dividing wall separating the pre-impingement chamber from the post-impingement chamber, and a plurality of cooling holes defined in the dividing wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine including an acoustic liner, according to various embodiments of the present subject matter.

FIGS. 2A, 2B, 2C, and 2D provide schematic axial cross-section views of an airfoil according to an exemplary embodiment of the present subject matter.

FIG. 3 provides a schematic radial cross-section view of an airfoil according to an exemplary embodiment of the present subject matter.

FIG. 4 provides a schematic axial cross-section view of the airfoil of FIG. 3 according to an exemplary embodiment of the present subject matter.

FIG. 5 provides a schematic axial cross-section view of the airfoil of FIG. 3 according to another exemplary embodiment of the present subject matter.

FIG. 6 provides a schematic radial cross-section view of an airfoil according to an exemplary embodiment of the present subject matter.

FIG. 7 provides a schematic axial cross-section view of the airfoil of FIG. 6 according to an exemplary embodiment of the present subject matter.

FIGS. 8, 9, and 10 provide schematic radial cross-section views of an airfoil according to various exemplary embodiments of the present subject matter.

FIG. 11 provides a flow diagram of a method for forming an integral airfoil, rib, and impingement baffle according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "forward" and "aft" refer to relative positions within an engine, with forward referring to a position closer to an ambient air inlet and aft referring to a position closer to an exhaust nozzle of the engine. The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, terms of approximation, such as "approximately," "substantially," or "about," refer to being within a ten percent margin of error.

The present subject matter is generally directed to an airfoil and a method for additively manufacturing the airfoil. The airfoil described herein is an integral structure that includes an outer wall defining a pressure side, suction side, leading edge, and trailing edge of the airfoil; a rib extending within the airfoil; a first pre-impingement chamber; a first post-impingement chamber surrounding the first pre-impingement chamber; a dividing wall segment separating the first pre-impingement chamber from the first post-impingement chamber; and a plurality of cooling holes defined in the dividing wall segment. The outer wall, rib, and dividing wall segment are integrally formed as a single monolithic component. In particular embodiments, the airfoil also includes a second pre-impingement chamber and a second post-impingement chamber, with a second dividing wall segment separating the second pre- and post-impingement chambers. The outer wall, rib, first dividing wall segment, and second dividing wall segment are integrally formed as a single monolithic component. Moreover, the first pre-impingement chamber, first post-impingement chamber, second pre-impingement chamber, and second post-impingement chamber are arranged in series. As such, a cooling fluid introduced into the first pre-impingement chamber flows from the first pre-impingement chamber into the first post-impingement chamber, from the first post-impingement chamber into the second pre-impingement chamber, and from the second pre-impingement chamber into the second post-impingement chamber. Further, although particularly described with respect to additive manufacturing methods, it will be appreciated that other methods also may be suitable for producing an integral airfoil as described herein.

By integrating the various portions of the airfoil into a single piece structure, the airfoil configuration is simpler and easier to manufacture than multi-piece airfoils, e.g., airfoils utilizing separate impingement baffle inserts to provide impingement cooling within airfoil cavities. More specifically, the single piece airfoil structure has a shorter assembly time and reduced part count compared to multi-piece designs. Additionally, by additively manufacturing the airfoil, the airfoil cooling can be tuned to the specific cooling needs of a particular airfoil (e.g., the cooling needs of an airfoil at a certain location within a gas turbine engine) without appreciably impacting the weight, cost, supply chain delivery schedule, etc. of the airfoil.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Referring now to FIGS. 2A through 2D, schematic axial cross-section views of an airfoil 100 are provided according to an exemplary embodiment of the present subject matter. The airfoil 100 includes an outer wall 102 that defines a concave pressure side 104 and an opposite convex suction side 106. Opposite pressure and suction sides 104, 106 of the airfoil 100 radially extend between an inner end 108 and an outer end 110 along an airfoil span S (FIGS. 3, 6, 8-10). Moreover, pressure and suction sides 104, 106 of the airfoil 100 extend axially between a leading edge 112 and an opposite trailing edge 114, such that the outer wall 102 defines the pressure side 104, suction side 106, leading edge 112, and trailing edge 114, and the pressure and suction sides 104, 106 define an outer surface 116 of the airfoil 100. Additionally, the airfoil 100 includes a trailing edge portion 118 that includes its trailing edge 114. The trailing edge portion 118 is located aft of an aft cavity 117 defined by the airfoil 100; the aft cavity 117 and a forward cavity 115, as well as the division of the cavities 115, 117 into various chambers 128, 130, 132, 134, are described in greater detail below.

Further, a rib 120 extends within the airfoil 100 from the pressure side 104 of the outer wall 102 to the suction side 106 of the outer wall 102. Moreover, the rib 120 extends radially from the inner end 108 to the outer end 110, as shown, e.g., in FIG. 3. The airfoil 100 also includes a dividing wall 122 that separates the cavities 115, 117 defined by the airfoil 100 into the various chambers 128, 130, 132, 134 such that the chambers 128, 130, 132, 134 are arranged in series as further described herein. A plurality of cooling holes 136 are defined in the dividing wall 122 such that a cooling fluid F may pass from one chamber to another and impinge on inner surfaces of the airfoil 100. In this way, the dividing wall 122 may be referred to as an impingement baffle. The rib 120 also defines one or more rib crossover holes 138 for the cooling fluid F to flow through. The outer wall 102, rib 120, and dividing wall 122 are integrally formed as a single monolithic component, such that the airfoil 100 is a single monolithic component.

In general, the exemplary embodiments of the airfoil 100 described herein may be manufactured or formed using any suitable process. However, in accordance with several aspects of the present subject matter, the airfoil 100 may be formed using an additive-manufacturing process, such as a 3D printing process. The use of such a process may allow the airfoil 100 to be formed integrally, as a single monolithic component, or as any suitable number of sub-components. In particular, the manufacturing process may allow the airfoil 100 to be integrally formed and include a variety of features not possible when using prior manufacturing methods. For example, the additive manufacturing methods described herein enable the manufacture of airfoils having any suitable size and shape with one or more configurations of internal impingement chambers or cavities, cooling holes, and crossover holes, as well as other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique impingement baffle geometries, such as impingement baffles or dividing walls that extend within airfoil cavities, are integral with one or more portions of the airfoil, and define cooling holes therein in precise, specified locations. The unique baffle geometries also may include conforming to the shape or outline of the airfoil cavity in which the baffle is defined, i.e., the impingement baffle or dividing wall may wrap around the cavity in close proximity to the cavity surface, mimicking the contours of the cavity. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

As described above in reference to FIGS. 2A through 2D, the depicted exemplary airfoil 100 comprises a concave pressure side 104 opposite a convex suction side 106 and an inner end 108 radially spaced apart from an outer end 110. The pressure side 104 and the suction side 106 extend axially from a leading edge 112 to a trailing edge 114. An outer wall 102 defines the pressure side 104, suction side 106, leading edge 112, and trailing edge 114. A rib 120 extends within the airfoil 100 from the pressure side 104 to the suction side 106 of the outer wall 102 and radially from the inner end 108 to the outer end 110 of the airfoil 100. The rib 120 separates the airfoil 100 into a forward portion 124 and an aft portion 126.

Further, the airfoil 100 defines several cavities or impingement chambers for receipt of a flow of cooling fluid. In the forward portion 124, the airfoil 100 defines a first pre-impingement chamber 128 and a first post-impingement chamber 130 that surrounds the first pre-impingement chamber 128. The dividing wall 122 separates the first pre-impingement chamber 128 from the first post-impingement chamber 130, i.e., the dividing wall 122 wraps around or extends about the forward cavity 115 to define the first pre-impingement chamber 128 and the first post-impingement chamber 130. Accordingly, the first post-impingement chamber 130 is proximate the outer wall 102 of the airfoil 100, and the first pre-impingement chamber 128 is separated from the outer wall 102 by the dividing wall 122 and the first post-impingement chamber 130. As previously described, the outer wall 102, rib 120, and dividing wall 122 are integrally formed such that the airfoil 100 is a single monolithic component.

In the aft portion 126, the airfoil 100 defines a second pre-impingement chamber 132 and a second post-impingement chamber 134. The second post-impingement chamber 134 is proximate the outer wall 102 of the airfoil 100 and comprises a pressure side portion 134a and a suction side portion 134b. The pressure side portion 134a is proximate the pressure side 104 of the airfoil 100, and the suction side portion 134b is proximate the suction side 106 of the airfoil 100. In other embodiments, the airfoil 100 may define multiple pressure side portions 134a and/or multiple suction side portions 134b, e.g., the pressure side portion 134a and/or the suction side portion 134b may be segmented axially and/or radially to define multiple second post-impingement chamber portions. In still other embodiments, the second post-impingement chamber 134 may comprise only a pressure side portion or only a suction side portion. That is, the second post-impingement chamber 134 may be defined proximate the outer wall 102 along only one of the pressure side 104 or suction side 106 rather than along both sides 104, 106 or rather than surrounding the second pre-impingement chamber 132 like the first post-impingement chamber 130 surrounds the first pre-impingement chamber 128. As such, the second pre-impingement chamber 132 may be defined proximate the outer wall 102 along the pressure side 104 or the suction side 106 rather than being separated from the outer wall 102 by the second post-impingement chamber 134 or second post-impingement chamber portions 134a, 134b.

Like the first pre- and post-impingement chambers 128, 130, the dividing wall 122 separates the second pre-impingement chamber 132 from the second post-impingement chamber 134 such that the second pre-impingement chamber 132 is separated from the outer wall 102 of the airfoil 100 by the dividing wall 122 and the second post-impingement chamber 134. However, unlike the first pre- and post-impingement chambers 128, 130, the dividing wall 122 does not wrap around or extend about the aft cavity 117 to define the second pre- and post-impingement chambers 132, 134. Instead, the dividing wall 122 extends from the rib 120 to an aft end of the aft cavity 117 on each of the pressure side 104 and suction side 106 to define the second pre-impingement chamber 132, the pressure side portion 134a of the second post-impingement chamber 134, and the suction side portion 134b of the second post-impingement chamber 134. More particularly, the dividing wall 122 separating the first pre-impingement chamber 128 from the first post-impingement chamber 130 may be referred to as a first dividing wall segment 122a. Further, the dividing wall 122 separating the second pre-impingement chamber 132 from the pressure side portion 134a of the second post-impingement chamber 134 may be referred to as a pressure side dividing wall segment 122b. Similarly, the dividing wall 122 separating the second pre-impingement chamber 132 from the suction side portion 134b of the second post-impingement chamber 134 may be referred to as a suction side dividing wall segment 122c. In the depicted embodiment, the pressure side dividing wall segment 122b and the suction side dividing wall segment 122c are integrally formed with the outer wall 102, rib 120, and first dividing wall segment 122a as a single monolithic component. As previously described, in other embodiments the dividing wall 122 may comprise other segments to define multiple pressure side and/or suction side portions 134a, 134b, or may comprise fewer segments such that the second post-impingement chamber 134 is defined along only one of the pressure side 104 or suction side 106.

A plurality of cooling holes 136 are defined in the dividing wall 122. More specifically, one or more cooling holes 136 are defined in the first dividing wall segment 122a, one or more cooling holes 136 are defined in the pressure side dividing wall segment 122b, and one or more cooling holes 136 are defined in the suction side dividing wall segment 122c. Further, at least one rib crossover hole 138 is defined in the rib 120. The at least one rib crossover hole 138 has an inlet 140 at the first post-impingement chamber 130 and an outlet 142 at the second pre-impingement chamber 132, which provides fluid communication between the first post-impingement chamber 130 and the second pre-impingement chamber 132.

In the trailing edge portion 118, the airfoil 100 defines a plurality of trailing edge slots 144. Each trailing edge slot 144 has an outlet 146 defined at the trailing edge 114. In some embodiments, such as the embodiments illustrated in FIGS. 3 through 8, each trailing edge slot 144 extends from the second post-impingement chamber 134 to the trailing edge 114. In other embodiments, such as the embodiment illustrated in FIGS. 2A through 2D, the trailing edge portion 118 defines a radially extending trailing edge chamber 148 between the second post-impingement chamber 134 and the trailing edge slots 144. At least one trailing edge crossover hole 150 is defined in the trailing edge portion 118 to permit a flow of fluid from the second post-impingement chamber 134 to the trailing edge chamber 148. As such, each trailing edge crossover hole 150 has an inlet 152 at the second post-impingement chamber 134 and an outlet 154 at the trailing edge chamber 148. The plurality of trailing edge slots 144 extend from the trailing edge chamber 148 to the trailing edge 114, such that the plurality of trailing edge slots 144 have an inlet 156 at the trailing edge chamber 148, with the outlet 146 of the trailing edge slots 144 defined at the trailing edge 114 as previously described. It will be appreciated that each of the trailing edge chamber 148 and the trailing edge slots 144 are optional, i.e., some embodiments of the airfoil 100 may not include a radially extending chamber aft of the second pre- and post-impingement chambers 132, 134 and/or may not include one or more slots having outlets defined along the trailing edge 114. Further, some embodiments may include holes defined along the trailing edge 114 rather than slots 144, but other embodiments may include neither trailing edge holes nor trailing edge slots 144.

FIG. 2A provides a schematic axial cross-section view of the airfoil 100 and illustrates exemplary flow paths for a cooling fluid F that is received within the first pre-impingement chamber 128. As illustrated in FIG. 2A, a flow of cooling fluid F enters the first pre-impingement chamber 128 (and therefore, the airfoil 100) along a substantially radial direction. The cooling fluid F flows through cooling holes 136 (FIGS. 2B-2D) in the dividing wall 122 to impinge on the outer wall 102 and rib 120. Further, the cooling fluid F flows through the one or more rib crossover holes 138 to pass from the first post-impingement chamber 130 to the second pre-impingement chamber 132. Moreover, the cooling fluid F flows through the one or more trailing edge crossover holes 150 to pass from the second post-impingement chamber 134 to the trailing edge chamber 148. From the trailing edge chamber 148, the cooling fluid F flows through the one or more trailing edge slots 144, e.g., to provide film cooling along the trailing edge 114.

Referring to FIGS. 2B through 2D, the cooling holes 136 may be defined at a plurality of radial and axial locations along the first dividing wall segment 122a, the pressure side dividing wall segment 122b, and the suction side dividing wall segment 122c. Further, in embodiments in which more than one rib crossover hole 138 is defined in the rib 120, the rib crossover holes 138 may be defined at different radial and/or axial locations in the rib 120. Similarly, in embodiments in which more than one trailing edge crossover hole 150 is defined in the trailing edge portion 118, the trailing edge crossover holes 150 may be defined at different radial and/or axial locations in the trailing edge portion 118. Moreover, in embodiments in which more than one trailing edge slot 144 is defined in the trailing edge portion 118, the trailing edge slots 144 are spaced apart from one another along the radial direction R.

More specifically, FIG. 2B provides a schematic axial cross-section view of the airfoil 100, where the axial cross-section is taken at a first radial location, i.e., a first location along the airfoil span S. A first plurality of cooling holes 136 are defined in the first dividing wall segment 122a between the first pre-impingement chamber 128 and the first post-impingement chamber 130. In addition, a trailing edge slot 144 is defined within the trailing edge portion 118. Nonetheless, at the depicted first span location, no cooling holes 136 are defined in the dividing wall 122 between the second pre-impingement chamber 132 and the second post-impingement chamber 134, no rib crossover hole 138 is defined in the rib 120, and no trailing edge crossover hole 150 is defined in the trailing edge portion 118.

FIG. 2C provides a schematic axial cross-section view of the airfoil 100, where the axial cross-section is taken at a second radial location, i.e., a second location along the airfoil span S. It will be appreciated that the second radial or span location is different from the first span location and is spaced apart from the first span location along the radial direction R (FIG. 1). As shown in FIG. 2C, a second plurality of cooling holes 136 are defined in the first dividing wall segment 122a between the first pre-impingement chamber 128 and the first post-impingement chamber 130. In addition to being defined at a different radial location (i.e., the second span location rather than the first span location), at least a portion of the second plurality of cooling holes 136 are defined at different axial locations than the first plurality of cooling holes 136 shown in FIG. 2B. Further, as illustrated in FIG. 2C, a rib crossover hole 138 is defined in the rib 120 at the second span location. Moreover, a plurality of cooling holes 136 are defined in the dividing wall 122 between the second pre-impingement chamber 132 and the second post-impingement chamber 134. More specifically, a portion of the cooling holes 136 are defined in the pressure side dividing wall segment 122b, and another portion of the cooling holes 136 are defined in the suction side dividing wall segment 122c. Additionally, a trailing edge slot 144 is defined within the trailing edge portion 118 at the second span location. However, at the depicted second span location, no trailing edge crossover hole 150 is defined from the second post-impingement chamber 134 to the trailing edge chamber 148.

FIG. 2D provides a schematic axial cross-section view of the airfoil 100, where the axial cross-section is taken at a third radial location, i.e., a third location along the airfoil span S. It will be appreciated that the third radial or span location is different from each of the first span location and the second span location and is spaced apart from the first and second span locations along the radial direction R (FIG. 1). As illustrated in FIG. 2D, a third plurality of cooling holes 136 are defined in the first dividing wall segment 122a between the first pre-impingement chamber 128 and the first post-impingement chamber 130. In addition to being defined at a different radial location (i.e., the third span location rather than the first or second span location), at least a portion of the third plurality of cooling holes 136 are defined at different axial locations than the first or second plurality of cooling holes 136 shown in FIGS. 2B and 2C. Additionally, a second rib crossover hole 138 is defined in the rib 120 at the third span location, and the second rib crossover hole 138 is defined at a slightly different axial location than the rib crossover hole 138 defined at the second span location shown in FIG. 2C. Further, a plurality of cooling holes 136 are defined in the dividing wall 122 between the second pre-impingement chamber 132 and the second post-impingement chamber 134, with a portion of the cooling holes 136 defined in the pressure side dividing wall segment 122b, and another portion of the cooling holes 136 defined in the suction side dividing wall segment 122c. As illustrated in FIGS. 2C and 2D, the cooling holes 136 defined in the pressure side and suction side dividing wall segments 122b, 122c at the second span location are defined at different axial locations from the cooling holes 136 defined in the pressure side and suction side dividing wall segments 122b, 122c at the third span location. Moreover, at the third span location, a trailing edge crossover hole 150 is defined from the second post-impingement chamber 134 to the trailing edge chamber 148, and a trailing edge slot is defined from the trailing edge chamber 148 to the trailing edge 114.

As shown in FIGS. 2B, 2C, and 2D, the cooling holes 136 may be defined in the dividing wall 122 to provide cooling at a specific axial, circumferential, and radial location of the airfoil 100. For example, FIG. 2D illustrates cooling holes 136 defined in the first dividing wall segment 122a adjacent the leading edge portion of the airfoil 100. The cooling holes 136 may be defined as shown because, e.g., the airfoil 100 needs cooling along its leading edge at the third radial location. It will be appreciated that other cooling holes 136 may be defined in the dividing wall 122 at other locations along the airfoil 100 to provide needed cooling at precise locations. As such, the impingement cooling scheme for the airfoil 100 is highly tunable and may reduce dedicated cooling for the airfoil 100 because the cooling is more efficiently utilized than known designs. Other advantages also may be realized from integrating the dividing wall or impingement baffle 122 with the airfoil 100 and using a manufacturing technique, such as additive manufacturing, to define cooling holes 136 in the impingement baffle 122 at particular locations.

Turning now to FIGS. 3 through 7, additional embodiments of the present subject matter will be discussed in greater detail. As shown in FIGS. 3 and 6, the airfoil 100 extends radially from an inner band 160 to an outer band 162. In some embodiments, the airfoil 100 is integrally formed with the inner band 160 and the outer band 162. In other embodiments, the airfoil 100 is integrally formed with one of the inner band 160 and outer band 162 and attached or coupled to the other of the inner band 160 and outer band 162. That is, the airfoil 100 and integral band 160 or 162 are formed separately from the attached band 160 or 162, and the separately formed band 160 or 162 is attached or coupled to the integral airfoil and band using any suitable technique or mechanism. In still other embodiments, the airfoil 100 is attached or coupled to both of the inner band 160 and outer band 162, i.e., the airfoil 100, inner band 160, and outer band 162 are separately formed components that are attached or coupled to one another using any suitable technique or mechanism. Suitable attachment techniques or mechanisms may include brazing, welding, or the like. Further, although not illustrated, it will be appreciated that, in various embodiments, the airfoil 100 shown in FIGS. 2A-2D likewise is integrally formed with inner and outer bands 160, 162, integrally formed with one of bands 160, 162 and attached or coupled to the other of bands 160, 162, or is formed separately from bands 160, 162 and attached or coupled to both of bands 160, 162 such that the airfoil 100 extends radially from the inner band 160 to the outer band 162.

Referring particularly to FIGS. 3 and 4, FIG. 3 provides a radial cross-section view the airfoil 100, and FIG. 4 provides an axial cross-section view of the airfoil 100, where the cross-section is taken along the line 4-4 shown in FIG. 3. As illustrated in FIGS. 3 and 4, an impingement insert or baffle 200 also may be used to form a pre-impingement chamber and a post-impingement chamber. The impingement insert 200 is a separate component from the airfoil 100 that may be attached to the airfoil 100, inner band 160, or outer band 162 using any suitable attachment technique or mechanism, e.g., by brazing, welding, etc. For example, in the depicted embodiments, the impingement insert 200 is positioned in the forward portion 124 of the airfoil 100 to define the first pre-impingement chamber 128 and first post-impingement chamber 130. Alternatively, rather than a separate insert that is inserted into a cavity in the airfoil 100, the baffle 200 may be integrally formed with the airfoil 100 as described and illustrated in FIGS. 2A-2D with respect to the dividing wall 122.

As further illustrated in the exemplary embodiment of FIGS. 3 and 4, a rib 120 is integrally formed with an outer wall 102, and the rib 120 separates the airfoil 100 into a forward portion 124 and aft portion 126, as previously described with respect to FIGS. 2A-2D. The outer wall 102 of the airfoil 100 defines a cavity 164 in the forward portion 124, and the impingement insert 200 is inserted within the cavity 164. Thus, the impingement insert 200 is a dividing wall, separating the cavity 164 into two chambers—the first pre-impingement chamber 128 and the first post-impingement chamber 130. A plurality of cooling holes 202 are defined in the impingement insert 200 such that a cooling fluid F that is received in the first pre-impingement chamber 128 may flow through the cooling holes 202 into the first post-impingement chamber 130 and impinge on the airfoil outer wall 102 at the forward portion 124 of the airfoil 100. The impingement insert 200 may be formed from any suitable material, e.g., a metal, a metal alloy, or the like.

Additionally, the aft portion 126 of the airfoil 100 may be formed as described above with respect to the exemplary embodiment shown in FIGS. 2A-2D. More specifically, a second pre-impingement chamber 132 and a second post-impingement chamber 134 are defined by the airfoil 100 aft of the rib 120. A dividing wall 122 that is integrally formed with the rib 120 and outer wall 102 separates the second pre-impingement chamber 132 from the second post-impingement chamber 134. That is, the outer wall 102, rib 120, and dividing wall 122 are a single monolithic component. At least one rib crossover hole 138 is defined in the rib that permits the cooling fluid F to flow from the first post-impingement chamber 130 to the second pre-impingement chamber 132. A plurality of cooling holes 136 are defined in the dividing wall 122, and the cooling fluid F may flow through the cooling holes 136 from the second pre-impingement chamber 132 into the second post-impingement chamber 134 and impinge on the airfoil outer wall 102 at the aft portion 126 of the airfoil 100. However, as shown in FIG. 4, the dividing wall 122 may wrap around or extend about the aft cavity 117 rather than comprise a pressure side segment 122b and a suction side segment 122c as shown in FIGS. 2A-2D. Moreover, it will be appreciated that, although described as having a separate impingement insert 200, in other embodiments, the airfoil 100 shown in FIG. 4 may comprise a first dividing wall segment 122a in the forward cavity 115 rather than the impingement insert 200, where the first dividing wall segment 122a is integral with the rib 120 like the dividing wall 122 described with respect to the aft cavity 117. In such embodiments, the outer wall 102, rib 120, and dividing wall 122, including the first dividing wall segment 122a, are integrally formed as a single monolithic component.

As further illustrated in FIG. 4, one or more outer wall apertures 166 may be defined in the outer wall 102 to permit the cooling fluid F to flow from an impingement chamber to the outer surface 116 of the airfoil 100. The flow from the outer wall apertures 166 may form a film of cooling fluid over the outer surface 116 or another form of surface cooling of the airfoil 100. Alternatively or additionally, the flow from the outer wall apertures 166 may provide a cooling flow to adjacent airfoils, inner and/or outer band segments, and/or downstream components.

Turning now to FIG. 5, an axial cross-section view is provided of the airfoil 100, where the cross-section is taken along the line 5-5 shown in FIG. 3, according to an alternative embodiment of the present subject matter. In the embodiment shown in FIG. 5, the airfoil 100 comprises two aft pre-impingement chambers rather than a single aft pre-impingement chamber as shown in the embodiment of FIG. 4. More particularly, the airfoil 100 illustrated in FIG. 5 includes a circumferentially segmented dividing wall 122, which defines a pressure side second pre-impingement chamber 132a and a suction side second pre-impingement chamber 132b. A pressure side dividing wall segment 122b defines the pressure side second pre-impingement chamber 132a and a suction side dividing wall segment 122c defines the suction side second pre-impingement chamber 132b. Unlike the pressure and suction side dividing wall segments 122b, 122c described with respect to FIGS. 2A-2D, the pressure and suction side dividing wall segments 122b, 122c wrap around or extend about a portion of the aft cavity 117 such that each segment 122b, 122c has a first end 168 that is integral with the rib 120 and a second end 170 that is integral with the rib 120. As such, two separate chambers, the pressure side second pre-impingement chamber 132a and the suction side second pre-impingement chamber 132b, are defined along the circumferential direction C in the aft cavity 117 of the airfoil 100. However, it will be appreciated that, in other embodiments, the dividing wall 122 may be segmented into more than two circumferential sections.

The second pre-impingement chambers 132a, 132b each receive a flow of cooling fluid F from the first post-impingement chamber 130 through at least one rib crossover hole 138 defined in the rib 120. That is, the cooling fluid F flows through at least one rib crossover hole 138 into the pressure side second pre-impingement chamber 132a, and the cooling fluid F flows through at least one different rib crossover hole 138 into the suction side second pre-impingement chamber 132b. From both the pressure side second pre-impingement chamber 132a and the suction side second pre-impingement chamber 132b, the cooling fluid F flows into the second post-impingement chamber 134, which surrounds each second pre-impingement chamber 132a, 132b. More specifically, at least one cooling hole 136 is defined in the pressure side dividing wall segment 122b through which the cooling fluid F may flow into the second post-impingement chamber 134, and at least one cooling hole 136 is defined in the suction side dividing wall segment 122c through which the cooling fluid F may flow into the second post-impingement chamber 134.

The flow of cooling fluid F into the second post-impingement chamber 134, which is proximate the outer wall 102, cools the outer wall 102 of the airfoil at the aft portion 126 of the airfoil 100. Further, as shown in FIG. 5, the cooling holes 136 defined in the pressure side dividing wall segment 122b may be defined only along the portion of the segment 122b adjacent the pressure side of the outer wall 102. Similarly, the cooling holes 136 defined in the suction side dividing wall segment 122c may be defined only along the portion of the segment 122c adjacent the suction side of the outer wall 102. In this way, the cooling fluid F delivered to the pressure and suction side second pre-impingement chambers 132a, 132b may be efficiently used to cool the airfoil outer wall 102, rather than needlessly directing a portion of the cooling fluid F toward the middle of the aft cavity 117.

Further, the airfoil 100 may include one or more trailing edge slots 144 defined in the trailing edge portion 118, through which the flow of cooling fluid F may be ejected from the airfoil interior to the exterior. Each trailing edge slot 144 has an inlet 156 defined at the second post-impingement cavity 134 and an outlet 146 defined at the trailing edge 114, and where a plurality of trailing edge slots 144 are defined in the trailing edge portion 118, the slots 144 are radially spaced apart from one another. Moreover, as illustrated in FIG. 5, one or more outer wall apertures 166 may be defined in the outer wall 102 to direct the cooling fluid F from the first post-impingement chamber 130 and/or the second post-impingement chamber 134 to the exterior of the airfoil 100. In exemplary embodiments, the at least one cooling hole 136, at least one rib crossover hole 138, and at least one trailing edge slot 144 are substantially parallel to one another. Additionally, although described with respect to an embodiment having an impingement insert 200 within the forward cavity 115 of the airfoil 100, it will be appreciated that two circumferentially separated second pre-impingement chambers 132 as illustrated in FIG. 5 also may be part of an airfoil 100 having an integral first dividing wall segment 122a that defines the first pre-impingement chamber 128. That is, in some embodiments, the airfoil 100 comprises an outer wall 102, a rib 120, a first dividing wall segment 122a defining the first pre-impingement chamber 128, a pressure side dividing wall segment 122b defining the pressure side second pre-impingement chamber 132a, and a suction side dividing wall segment 122c defining the suction side second pre-impingement chamber 132b that are integrally formed as a single monolithic component. In other embodiments, the dividing wall 122 within the forward cavity 115 may be circumferentially segmented rather than, or in addition to, the dividing wall 122 within the aft cavity 117.

Referring now to FIGS. 6 and 7, in yet other embodiments of the airfoil 100, additional cavities may be defined in the airfoil 100 that are in series with the first pre-impingement chamber 128, the first post-impingement chamber 130, the second pre-impingement chamber 132, and the second post-impingement chamber 134. More particularly, as illustrated in FIGS. 6 and 7, the airfoil 100 may define a third pre-impingement chamber 172 that receives a flow of the cooling fluid F from the second post-impingement chamber 134 and a third post-impingement chamber 174 that surrounds the third pre-impingement chamber 172 and is proximate the outer wall 102. A first rib 120a and a second rib 120b separate the airfoil 100 into a forward portion 124, a middle portion 125, and an aft portion 126. The first pre- and post-impingement chambers 128, 130 are defined in the forward portion 124, the second pre- and post-impingement chambers 132, 134 are defined in the middle portion 125, and the third pre- and post-impingement chambers 172, 174 are defined in the aft portion 126. Further, the dividing wall 122 comprises a middle dividing wall segment 122d that wraps around or extends about a middle cavity 119 of the airfoil 100 to separate the second pre-impingement chamber 132 from the second post-impingement chamber 134 and thereby define the two chambers 132, 134. Similarly, the dividing wall 122 comprises an aft dividing wall segment 122e that wraps around or extends about the aft cavity 117 to separate the third pre-impingement chamber 172 from the third post-impingement chamber 174 and thereby define the two chambers 172, 174. In exemplary embodiments, the outer wall 102, first rib 120a, second rib 120b, first dividing wall segment 122a, middle dividing wall segment 122d, and aft dividing wall segment 122e are integrally formed as a single monolithic component. However, in other embodiments, at least one of the dividing wall segments 122a, 122d, 122e may be an impingement insert 200 that is separate from the airfoil 100.

The airfoil 100 depicted in FIGS. 6 and 7 may include other features described with respect to FIGS. 2A-2D, 3, 4, and 5. For example, the flow of cooling fluid F is received in the first pre-impingement chamber 128, and at least one cooling hole 136 is defined in the first dividing wall segment 122a to permit the cooling fluid F to flow from the first pre-impingement chamber 128 into the first post-impingement chamber 130. Further, at least one rib crossover hole 138 is defined in the first rib 120a, and the crossover hole 138 has an inlet 140 at the first post-impingement chamber 130 and an outlet at the second pre-impingement chamber 132 such that the cooling fluid F may flow from the first post-impingement chamber 130 into the second pre-impingement chamber 132. At least one cooling hole 136 is defined in the middle dividing wall segment 122d to permit the cooling fluid F to flow from the second pre-impingement chamber 132 into the second post-impingement chamber 134. Moreover, at least one rib crossover hole 138 is defined in the second rib 120b, and the crossover hole 138 has an inlet 140 at the second post-impingement chamber 134 and an outlet at the third pre-impingement chamber 172 such that the cooling fluid F may flow from the second post-impingement chamber 134 into the third pre-impingement chamber 172. At least one cooling hole 136 is defined in the aft dividing wall segment 122e to permit the cooling fluid F to flow from the third pre-impingement chamber 172 into the third post-impingement chamber 174. Additionally, in some embodiments, at least one trailing edge slot 144 may be defined in the trailing edge portion 118 and/or at least one outer wall aperture 166 may be defined in the outer wall 102 to permit the cooling fluid F to flow from the interior of the airfoil 100 to the exterior of the airfoil 100.

Of course, while only two and three sets of pre- and post-impingement chambers in series are shown in the depicted embodiments, it will be understood that, in other embodiments, more than three sets of pre- and post-impingement chambers may be defined in series within an airfoil 100. Each pre-impingement chamber after the first pre-impingement chamber 128 receives cooling fluid from the preceding post-impingement chamber, e.g., through one or more rib crossover holes 138. A dividing wall 122 that is integrally formed with the airfoil 100 may separate cavities within the airfoil 100 to define each pre-impingement and post-impingement chamber, or at least one set of pre- and post-impingement chambers may be defined by an impingement insert that is separate from the airfoil 100.

Turning to FIGS. 8 through 10, additional embodiments of the airfoil 100 will be described. Each of FIGS. 8, 9, and 10 provides a radial cross-section view of the airfoil 100 according to an exemplary embodiment of the present subject matter. In particular, FIG. 8 illustrates a radially segmented dividing wall 122 in the aft cavity 117, which divides the aft cavity 117 into an inner second pre-impingement chamber 132c and an outer second pre-impingement chamber 132d. Thus, rather than the circumferentially segmented dividing wall 122 illustrated in FIG. 5, the dividing wall 122 of FIG. 8 is segmented along the radial direction R and the airfoil span S. As such, more than one impingement baffle is defined along the radial direction R, i.e., an inner dividing wall segment 122f and an outer dividing wall segment 122g. A first rib crossover hole 138 is defined from the first post-impingement chamber 130 to the inner second pre-impingement chamber 132c and a second rib crossover hole 138 is defined from the first post-impingement chamber 130 to the outer second pre-impingement chamber 132d to permit the cooling fluid F to flow from the first post-impingement chamber 130 to each of the inner and outer second pre-impingement chambers 132c, 132d. At least one cooling hole 136 is defined in the inner dividing wall segment 122f to permit the cooling fluid F to flow from the inner second pre-impingement chamber 132c to the second post-impingement chamber 134. Similarly, at least one cooling hole 136 is defined in the outer dividing wall segment 122g to permit the cooling fluid F to flow from the outer second pre-impingement chamber 132d to the second post-impingement chamber 134. Moreover, the airfoil 100 depicted in FIG. 8 may comprise one or more features as described with respect to the other embodiments detailed herein, e.g., the airfoil 100 may comprise one or more trailing edge slots 144, one or more outer wall apertures 166, etc.

It will be appreciated that, although the dividing wall 122 is shown as segmented into only two radial sections within the aft cavity 117, in other embodiments, the dividing wall 122 may be segmented into more than two radial sections and/or the dividing wall 122 within the forward cavity 115 may be radially segmented. Further, although described herein with respect to a circumferentially segmented dividing wall 122 (FIG. 5) and a radially segmented dividing wall 122 (FIG. 8), in other embodiments the dividing wall 122 within either or both of the forward and aft cavities 115, 117 may be axially segmented. For instance, the dividing wall 122 within the aft cavity 117 may be axially segmented into a forward dividing wall segment, e.g., that extends from the rib 120, and an aft dividing wall segment, e.g., that extends from the trailing edge portion 118. Thus, with a segmented dividing wall or impingement baffle 122, each dividing wall segment lines or extends about only a portion of the respective airfoil cavity, rather than wrapping fully around the cavity like the dividing wall 122 wraps around the forward cavity 115 as illustrated in FIGS. 2A-2D.

Referring now to FIG. 9, the dividing wall 122 may be integral with either or both of the inner band 160 and outer band 162, rather than the rib 120, and the inner and outer bands 160, 162 may be integrally formed with the airfoil 100. More particularly, as shown in FIG. 9, the first dividing wall segment 122a may be integrally formed with the outer band 162 and extend into the forward cavity 115. The dividing wall segment within the aft cavity 117, e.g., the pressure side and suction side dividing wall segments 122b, 122c similar to the segments shown in FIG. 5, may be integrally formed with the inner band 160 and extend into the aft cavity 117. One or more cooling holes 136 defined in the first dividing wall segment 122a permit the cooling fluid F, which is first received in the first pre-impingement chamber 128, to flow into the first post-impingement chamber 130. One or more first openings 178 may be defined in the inner band 160 forward of the rib 120 to permit the cooling fluid F to flow from the first post-impingement chamber 130 into a hub box 180 defined inward of the inner band 160. One or more second openings 182 may be defined in the inner band 160 aft of the rib 120 to permit the cooling fluid F to flow from the hub box 180 into the second pre-impingement chamber(s) 132. As previously described, one or more cooling holes 136 are defined in the dividing wall 122 to permit the cooling fluid F to flow from the second pre-impingement chamber(s) 132 into the second post-impingement chamber 134. Further, the airfoil 100 illustrated in FIG. 9 may comprise one or more features as described with respect to the other embodiments detailed herein, e.g., the airfoil 100 may comprise one or more trailing edge slots 144, one or more outer wall apertures 166, etc.

In an alternative embodiment to the embodiment shown in FIG. 9, the dividing wall 122 may extend from the forward cavity 115, into the hub box 180, and into the aft cavity 117. Thus, rather than having one or more dividing wall segments within the aft cavity that, e.g., are integral with the inner band 160, the dividing wall 122 may wrap from the forward cavity 115 to the aft cavity 117. In such embodiments, the dividing wall 122 may or may not be integral with the inner band 160 near either of the forward cavity 115 or aft cavity 117.

FIG. 10 depicts a dividing wall 122 that extends within the forward cavity 115, through the rib 120, and into the aft cavity 117 to define the first pre- and post-impingement chambers 128, 130 within the forward cavity 115 and the second pre- and post-impingement chambers 132, 134 within the aft cavity 117. That is, the dividing wall 122 within the forward cavity 115 is connected to the dividing wall 122 within the aft cavity 117, extending through the rib 120. Thus, the dividing wall 122 defines crossover holes 138 from the first pre-impingement chamber 128 to the second pre-impingement chamber 132. As shown in FIG. 10, the dividing wall 122 may extend from the inner band 160 or outer band 162 into the forward cavity 115 and from the forward cavity 115 into the aft cavity 117. One or more supports 184 may extend from the inner band 160, outer band 162, and/or outer wall 102 to support the dividing wall 122 within the aft cavity 117. Alternatively, the dividing wall 122 may extend from the inner band 160 or outer band 162 into the aft cavity 117 and from the aft cavity 117 into the forward cavity 115, where one or more supports 184 may extend from the inner band 160, outer band 162, and/or outer wall 102 to support the dividing wall 122 within the forward cavity 115. As described herein, one or more cooling holes 136 may be defined in the dividing wall 122 in each of the dividing wall segments within the forward cavity 115 and aft cavity 117 to permit the cooling fluid F to flow from the respective pre-impingement chamber 128, 132 to the respective post-impingement chamber 130, 134. Moreover, the airfoil 100 illustrated in FIG. 10 may comprise one or more features as described with respect to the other embodiments detailed herein, e.g., the airfoil 100 may comprise one or more trailing edge slots 144, one or more outer wall apertures 166, etc.

As shown in FIGS. 3, 6, 8, 9, and 10, the airfoil 100 may include an outlet channel 186 that extends through the inner band 160 into the hub box 180. The outlet channel 186 may be integral with the dividing wall 122 or may be part of the impingement insert 200, in embodiments utilizing the impingement insert 200 rather than the first dividing wall segment 122a to define the first pre- and post-impingement chambers 128, 130. The outlet channel 186 defines an orifice 188 in the hub box 180 such that the cooling fluid F may flow from the first pre-impingement chamber 128, through the outlet channel 186, and into the hub box 180 through the orifice 188. The cooling fluid F may exit the hub box 180 at one or more forward locations 190 or aft locations 192, or at any suitable location between the forward and aft locations 190, 192.

Although shown in FIGS. 3, 6, 8, 9, and 10 as fed through the outer band 162 with an outlet channel 186 that extends through the inner band 160, in other embodiments, the configuration may be reversed. That is, the cooling fluid F may be fed to the first pre-impingement chamber 128 through the inner band 160, and an outlet channel 186 may extend through the outer band 162 such that the cooling fluid F can flow radially outward from the airfoil cavities. Such reverse configurations may be used for nozzles in different stages of a turbine section of a gas turbine engine, e.g., a stage 1 nozzle in the high pressure turbine section 28 of turbofan engine 10 may be fed cooling fluid F through the inner band 160 with an outlet 186 in the outer band 162, while a stage 2 nozzle is fed through the outer band 162 with an outlet 186 in the inner band 160. In other embodiments, the outlet channel 186 may be omitted, and the cooling fluid F may exit the airfoil cavity 115, 117, 119 through the same band 160, 162 as the cooling fluid F is fed to the airfoil 100. For instance, where the cooling fluid F is fed through the outer band 162, the airfoil 100 may define one or more openings in the outer band 162 through which the cooling fluid F flows radially outward from one or more of the airfoil cavities 115, 117, 119.

In some embodiments of the airfoil 100, the dividing wall 122 or dividing wall segment is integral with a rib 120 of the airfoil 100 and/or the outer wall 102 of the airfoil 100 along a radial length or span of the airfoil 100. For instance, as illustrated in FIG. 3, the dividing wall 122 is integral with the rib 120 at multiple radial locations along a first radial length $L_1$. Likewise, as illustrated in FIG. 6, the middle dividing wall segment 122d is integral with the first rib 120a at multiple radial locations along a second radial length $L_2$, and the aft dividing wall segment 122e is integral with the second rib 120b at multiple radial locations along a third radial length $L_3$. That is, the dividing wall 122 (or dividing wall segment) is integral with the respective rib 120 at more than one radial location. In other embodiments, the dividing wall 122 (or dividing wall segment) may be integral with the rib 120, outer band 162, and/or inner band 160 continuously along a radial length. In still other embodiments, the dividing wall 122 (or dividing wall segment) may be integral with the rib 120, outer band 162, or inner band 160 at only one radial location, or the impingement insert 200 may be attached to the rib 120, outer band 162, or inner band 160 at only one radial location, such that the dividing wall 122 or impingement insert 200 is cantilevered or floating with respect to the airfoil 100. For example, the impingement insert 200 illustrated in FIG. 3 is attached to the outer band 162 at only one radial location, a radially outer surface 176 of the outer band 162. Similarly, the first dividing wall segment 122a depicted in FIG. 6 is integrated with the outer band 162 at only one radial location, the radially outer surface 176 of the outer band 162. In yet other embodiments, the dividing wall 122 or impingement insert 200 may be essentially cantilevered by attaching the wall 122 or insert 200 at one end and locally connecting it, e.g., to the rib 120, at other radial locations.

In still other embodiments, a plurality of pins 194, e.g., as shown in FIG. 7, may extend from the dividing wall 122 to the outer wall 102. The pins 194 may be relatively thin pieces of the material from which the airfoil 100 is formed that are integral with the outer wall 102 and dividing wall 122, i.e., a first end is integral with the outer wall 102 and a second end is integral with the dividing wall 122. As such, the pins 194 may provide paths for conduction cooling of the outer wall 102.

It should be appreciated that the airfoil 100 is described herein only for the purpose of explaining aspects of the present subject matter. For example, the airfoil 100 will be used herein to describe exemplary configurations, constructions, and methods of manufacturing the airfoil 100. It should be appreciated that the additive manufacturing techniques discussed herein may be used to manufacture other airfoils or similar components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of the airfoil 100 according to an exemplary embodiment of the present subject matter has been presented, an exemplary method 1100 is provided for forming an airfoil according to an exemplary embodiment of the present subject matter. Method 1100 can be used by a manufacturer to form the airfoil 100, or any other suitable airfoil. It should be appreciated that the exemplary method 1100 is discussed herein only to describe exemplary aspects of the present subject matter and is not intended to be limiting.

Referring now to FIG. 11, method 1100 includes, at step 1110, depositing a layer of additive material on a bed of an additive manufacturing machine. Method 1100 further includes, at step 1120, selectively directing energy from an energy source onto the layer of additive material to fuse a portion of the additive material and form an airfoil. For example, using the example from above, the airfoil 100 may be formed for a turbine section 28, 30 of the core turbine engine 16 of the turbofan jet engine 10.

The additively manufactured airfoil 100 may include a concave pressure side 104 opposite a convex suction side 106 and an inner end 108 radially spaced apart from an outer end 110. The pressure side 104 and the suction side 106 extend axially from a leading edge 112 to a trailing edge 114. The airfoil 100 further may include an outer wall 102 defining the pressure side 104, suction side 106, leading edge 112, and trailing edge 114; a rib 120 that extends within the airfoil 100 from the pressure side 104 of the outer wall 102 to the suction side 106 of the outer wall 102; a pre-impingement chamber 128; a post-impingement chamber 130 surrounding the pre-impingement chamber 128; a dividing wall 122 separating the pre-impingement chamber 128 from the post-impingement chamber 130; and a plurality of cooling holes 136 defined in the dividing wall 122. Notably, the outer wall 102, rib 120, and dividing wall 122 are integrally formed during the additive manufacturing process such that the outer wall 102, rib 120, and dividing wall 122 are a single monolithic component.

FIG. 11 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 1100 are explained using the airfoil 100 as an example, it should be appreciated that these methods may be applied to manufacture any suitable airfoil. Additionally, although only an additive manufacturing method is described in detail herein, it will be understood that the airfoil 100, having an integral outer wall 102, rib 120, and dividing wall 122, can be formed by other suitable methods, such as casting in a suitable mold or the like.

Various embodiments of an airfoil and a method for manufacturing an airfoil are described above. Notably, the airfoil 100 generally may include geometries and configurations whose practical implementations are facilitated by an additive manufacturing process, as described herein. For example, using the additive manufacturing methods described herein, the airfoil 100 may include a plurality of impingement chambers and cooling holes such that the airfoil 100 is tuned to provide cooling at certain locations of the airfoil 100. That is, the impingement baffle or dividing wall 122 and the cooling holes 136 therein may be defined at specific locations within the airfoil 100 to provide cooling at specified airfoil locations. For instance, as shown in the figures, the cooling holes 136 may be defined in the dividing wall 122 adjacent the airfoil leading edge 112, the airfoil pressure side 104, and/or the airfoil suction side 106, and the cooling holes 136 may be defined near these portions of the airfoil 100 at a single or multiple radial or span locations. Such a tailored cooling scheme may be developed for each individual airfoil 100, i.e., the configuration of the dividing wall(s) or impingement baffle(s) 122 and/or the cooling holes 136 may vary from one airfoil to another, or a group of airfoils 100 may have the same cooling configuration. The foregoing features, as well as the other features described herein, may be introduced during the design of the airfoil, such that they may be easily integrated into the airfoil during the build process at little or no additional cost. Moreover, the entire airfoil, including the outer wall, the rib, the dividing wall, and all other features, as well as the inner and/or outer bands in appropriate embodiments, can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil, comprising:
a concave pressure side opposite a convex suction side and an inner end radially spaced apart from an outer end, the pressure side and the suction side extending axially from a leading edge to a trailing edge;
an outer wall defining the pressure side, suction side, leading edge, and trailing edge;
a rib extending linearly within the airfoil from the pressure side of the outer wall to the suction side of the outer wall, the rib further extending radially from the inner end to the outer end, the rib separating the airfoil into a forward portion forward of the rib and an aft portion aft of the rib;
a first pre-impingement chamber in the forward portion;
a first post-impingement chamber in the forward portion, the first post-impingement chamber surrounding the first pre-impingement chamber;
a first dividing wall segment separating the first pre-impingement chamber from the first post-impingement chamber;
a second pre-impingement chamber in the aft portion;
a second post-impingement chamber in the aft portion;
a second dividing wall segment separating the second pre-impingement chamber from the second post-impingement chamber; and
a plurality of cooling holes defined in the first dividing wall segment and the second dividing wall segment,
wherein the first pre-impingement chamber, the first post-impingement chamber, the second pre-impingement chamber, and the second post-impingement chamber are arranged in series for the flow of a cooling fluid introduced into the first pre-impingement chamber to flow from the first pre-impingement chamber into the first post-impingement chamber, from the first post-impingement chamber into the second pre-impingement chamber, and from the second pre-impingement chamber into the second post-impingement chamber, and
wherein the outer wall, rib, first dividing wall segment, and second dividing wall segment are integrally formed as a single monolithic component.

2. The airfoil of claim 1, wherein the plurality of cooling holes are defined at a plurality of radial and axial locations along the dividing wall.

3. The airfoil of claim 1, further comprising:
at least one rib crossover hole defined in the rib, the at least one rib crossover hole having an inlet at the first post-impingement chamber and an outlet at the second pre-impingement chamber.

4. The airfoil of claim 3, further comprising:
a plurality of trailing edge slots, each trailing edge slot having an outlet defined at the trailing edge.

5. The airfoil of claim 4, further comprising:
a radially extending trailing edge chamber; and
at least one trailing edge crossover hole defined in a trailing edge portion of the airfoil, the at least one trailing edge crossover hole having an inlet at the second post-impingement chamber and an outlet at the trailing edge chamber,
wherein each trailing edge slot is defined from the trailing edge chamber to the trailing edge.

6. The airfoil of claim 1, wherein the second post-impingement chamber comprises a pressure side portion and a suction side portion.

7. The airfoil of claim 6, wherein the second dividing wall segment comprises:
a pressure side dividing wall segment separating the second pre-impingement chamber from the pressure side portion of the second post-impingement chamber; and
a suction side dividing wall segment separating the second pre-impingement chamber from the suction side portion of the second post-impingement chamber, and
wherein the plurality of cooling holes defined in the second dividing wall segment includes a first plurality of cooling holes defined in the pressure side dividing wall segment and a second plurality of cooling holes defined in the suction side dividing wall segment.

8. The airfoil of claim 1, wherein the first dividing wall segment is integral with the rib at only one radial location such that the first dividing wall segment is cantilevered with respect to the airfoil.

9. An additively manufactured airfoil, comprising:
a concave pressure side opposite a convex suction side and an inner end radially spaced apart from an outer end, the pressure side and the suction side extending axially from a leading edge to a trailing edge;
an outer wall defining the pressure side, suction side, leading edge, and trailing edge;
a rib extending linearly within the airfoil from the pressure side of the outer wall to the suction side of the outer wall, the rib further extending radially from the inner end to the outer end, the rib separating the airfoil into a forward portion forward of the rib and an aft portion aft of the rib;
at least four impingement chambers arranged in series, the at least four impingement chambers including at least two impingement chambers in the forward portion and at least two impingement chambers in the aft portion;
a dividing wall comprising a forward dividing wall segment disposed in the forward portion and separating the at least two impingement chambers in the forward portion, the dividing wall further comprising an aft dividing wall segment disposed in the aft portion and separating the at least two impingement chambers in the aft portion; and
at least one cooling hole defined in the dividing wall such that a cooling fluid can pass from one impingement chamber to another through the at least one cooling hole.

10. The additively manufactured airfoil of claim 9, wherein the at least two impingement chambers in the forward portion comprise:
- a first pre-impingement chamber; and
- a first post-impingement chamber, the first post-impingement chamber surrounding the first pre-impingement chamber.

11. The additively manufactured airfoil of claim 10, wherein the at least two impingement chambers in the aft portion comprise:
- a second pre-impingement chamber, and
- a second post-impingement chamber,
- wherein at least one rib crossover hole is defined in the rib, the at least one rib crossover hole having an inlet at the first post-impingement chamber and an outlet at the second pre-impingement chamber,
- wherein the aft dividing wall segment extends between the second pre-impingement chamber and the second post-impingement chamber, and
- wherein at least one cooling hole that extends from the second pre-impingement chamber to the second post-impingement chamber is defined in the aft dividing wall segment.

12. The additively manufactured airfoil of claim 11, wherein the first post-impingement chamber is proximate the outer wall, the second post-impingement chamber is proximate the outer wall, the first pre-impingement chamber is separated from the outer wall by the forward dividing wall segment and the first post-impingement chamber, and the second pre-impingement chamber is separated from the outer wall by the aft dividing wall segment and the second post-impingement chamber.

13. The additively manufactured airfoil of claim 10, wherein the at least two impingement chambers in the aft portion comprise:
- a pressure side second pre-impingement chamber,
- a suction side second pre-impingement chamber,
- a second post-impingement chamber,
- wherein a first rib crossover hole is defined in the rib, the first rib crossover hole having an inlet at the first post-impingement chamber and an outlet at the pressure side second pre-impingement chamber,
- wherein a second rib crossover hole is defined in the rib, the second rib crossover hole having an inlet at the first post-impingement chamber and an outlet at the suction side second pre-impingement chamber, and
- wherein the aft dividing wall segment comprises a pressure side dividing wall segment that extends between the pressure side second pre-impingement chamber and the second post-impingement chamber, the aft dividing wall segment further comprising a suction side dividing wall segment that extends between the suction side second pre-impingement chamber and the second post-impingement chamber.

14. The additively manufactured airfoil of claim 10, wherein the at least two impingement chambers in the aft portion comprise:
- an inner second pre-impingement chamber,
- an outer second pre-impingement chamber defined radially outward from the inner second pre-impingement chamber, and
- a second post-impingement chamber,
- wherein a first rib crossover hole is defined in the rib, the first rib crossover hole having an inlet at the first post-impingement chamber and an outlet at the inner second pre-impingement chamber; and
- wherein a second rib crossover hole is defined in the rib, the second rib crossover hole having an inlet at the first post-impingement chamber and an outlet at the outer second pre-impingement chamber, and
- wherein the aft dividing wall segment comprises an inner dividing wall segment that extends between the inner second pre-impingement chamber and the second post-impingement chamber, the aft dividing wall segment further comprising an outer dividing wall segment that extends between the outer second pre-impingement chamber and the second post-impingement chamber.

15. The additively manufactured airfoil of claim 9, wherein the airfoil extends between an inner band and an outer band, wherein the forward dividing wall segment is integral with the outer band, and wherein the aft dividing wall segment is integral with the inner band.

16. The additively manufactured airfoil of claim 9, wherein the dividing wall extends from the forward portion, through the rib, and into the aft portion.

17. The additively manufactured airfoil of claim 9, wherein the airfoil comprises a plurality of layers formed by:
- depositing a layer of additive material on a bed of an additive manufacturing machine; and
- selectively directing energy from an energy source onto the layer of additive material to fuse a portion of the additive material, and
- wherein the outer wall, rib, and dividing wall are integrally formed as a single monolithic component.

18. The additively manufactured airfoil of claim 9, wherein the forward dividing wall segment is an impingement insert that is separate from the airfoil, and wherein the aft dividing wall segment is integrally formed with the rib.

19. A method of manufacturing an airfoil, the method comprising:
- depositing a layer of additive material on a bed of an additive manufacturing machine; and
- selectively directing energy from an energy source onto the layer of additive material to fuse a portion of the additive material and form the airfoil, the airfoil comprising:
  - a concave pressure side opposite a convex suction side and an inner end radially spaced apart from an outer end, the pressure side and the suction side extending axially from a leading edge to a trailing edge;
  - an outer wall defining the pressure side, suction side, leading edge, and trailing edge;
  - a rib extending linearly within the airfoil from the pressure side of the outer wall to the suction side of the outer wall, the rib further extending radially from the inner end to the outer end;
  - a pre-impingement chamber;
  - a post-impingement chamber surrounding the pre-impingement chamber;
  - a dividing wall separating the pre-impingement chamber from the post-impingement chamber; and
  - a plurality of cooling holes defined in the dividing wall, the plurality of cooling holes including a first plurality of cooling holes defined at a first radial location along the dividing wall, a second plurality of cooling holes defined at a second radial location along the dividing wall, and a third plurality of cooling holes defined at a third radial location along the dividing wall,
- wherein the first plurality of cooling holes are defined at different axial locations than any of the second plurality of cooling holes and any of the third plurality of cooling holes, the second plurality of cooling holes are defined at different axial locations than any of the first plurality of cooling holes and any of the third plurality of cooling holes, and the third plurality of cooling holes are defined at different axial locations than any of the first plurality of cooling holes and any of the second plurality of cooling holes.

20. The method of claim 19, wherein the outer wall, rib, and dividing wall are integrally formed as a single monolithic component.

* * * * *